(12) United States Patent
Matsui

(10) Patent No.: US 12,331,177 B2
(45) Date of Patent: Jun. 17, 2025

(54) CROSSLINKED POLYOLEFIN RESIN FOAM AND MULTILAYER BODY

(71) Applicant: SEKISUI CHEMICAL CO., LTD., Osaka (JP)

(72) Inventor: Rie Matsui, Hasuda (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 880 days.

(21) Appl. No.: 17/280,064

(22) PCT Filed: Sep. 27, 2019

(86) PCT No.: PCT/JP2019/038418
§ 371 (c)(1),
(2) Date: Mar. 25, 2021

(87) PCT Pub. No.: WO2020/067538
PCT Pub. Date: Apr. 2, 2020

(65) Prior Publication Data
US 2021/0340347 A1 Nov. 4, 2021

(30) Foreign Application Priority Data

Sep. 28, 2018 (JP) .................... 2018-185919
May 27, 2019 (JP) .................... 2019-098519

(51) Int. Cl.
| | | |
|---|---|---|
| B32B 27/06 | (2006.01) | |
| B32B 3/08 | (2006.01) | |
| B32B 5/02 | (2006.01) | |
| B32B 5/18 | (2006.01) | |
| B32B 5/24 | (2006.01) | |
| B32B 5/32 | (2006.01) | |
| B32B 7/02 | (2019.01) | |
| B32B 7/023 | (2019.01) | |
| B32B 7/12 | (2006.01) | |
| B32B 27/08 | (2006.01) | |
| B32B 27/12 | (2006.01) | |
| B32B 27/18 | (2006.01) | |
| B32B 27/20 | (2006.01) | |
| B32B 27/30 | (2006.01) | |
| B32B 27/32 | (2006.01) | |
| B32B 27/36 | (2006.01) | |
| B32B 38/00 | (2006.01) | |
| C08J 9/00 | (2006.01) | |
| C08J 9/10 | (2006.01) | |
| C08J 9/12 | (2006.01) | |
| C08K 5/00 | (2006.01) | |
| C09J 7/26 | (2018.01) | |
| C09J 7/38 | (2018.01) | |

(52) U.S. Cl.
CPC .............. *C08J 9/103* (2013.01); *B32B 5/18* (2013.01); *B32B 27/08* (2013.01); *B32B 27/18* (2013.01); *B32B 27/32* (2013.01); *B32B 38/145* (2013.01); *C09J 7/26* (2018.01); *C09J 7/38* (2018.01); *B32B 2266/025* (2013.01); *B32B 2305/022* (2013.01); *B32B 2305/72* (2013.01); *B32B 2307/4023* (2013.01); *B32B 2307/414* (2013.01); *B32B 2307/536* (2013.01); *B32B 2307/732* (2013.01); *B32B 2457/20* (2013.01); *B32B 2605/003* (2013.01); *C08J 2201/026* (2013.01); *C08J 2207/02* (2013.01); *C08J 2323/06* (2013.01); *C08J 2323/08* (2013.01); *C08J 2323/12* (2013.01); *C08K 5/0083* (2013.01)

(58) Field of Classification Search
CPC ....... B32B 15/18; B32B 27/065; C08J 9/0061
See application file for complete search history.

(56) References Cited

U.S. PATENT DOCUMENTS

| | | |
|---|---|---|
| 9,180,810 B2 | 11/2015 | Hayashi et al. |
| 11,236,211 B2 | 2/2022 | Honda et al. |
| 2016/0122492 A1 | 5/2016 | Hoya et al. |

FOREIGN PATENT DOCUMENTS

| | | |
|---|---|---|
| CN | 105694218 A | 6/2016 |
| CN | 106232757 A | 12/2016 |
| JP | H08-67757 A | 3/1996 |
| JP | H09-278991 A | 10/1997 |
| JP | H10-219075 A | 8/1998 |
| JP | 2000-103893 A | 4/2000 |
| JP | 2004-339362 A | 12/2004 |
| JP | 2004-345185 A | 12/2004 |
| JP | 2007-091176 A | 4/2007 |

(Continued)

OTHER PUBLICATIONS

Machine translation of WO 2018/025343 to Nishimura et al. obtained from the European Patent Office website in May 2024 (Year: 2024).*

(Continued)

*Primary Examiner* — Melissa A Rioja
(74) *Attorney, Agent, or Firm* — Foley & Lardner LLP

(57) ABSTRACT

The present invention relates to a cross-linked polyolefin resin foam obtained by cross-linking and foaming a polyolefin resin composition containing at least a polyolefin resin, wherein the cross-linked polyolefin resin foam has a total light transmittance of 45% or more at the thickness of 0.3 mm or more and less than 1.0 mm, and the cross-linked polyolefin resin foam has a total light transmittance of 30% or more at the thickness of 1.0 mm or more and 5.0 mm or less.

The present invention provides a cross-linked polyolefin resin foam having excellent light transmittance.

12 Claims, 2 Drawing Sheets

(56) References Cited

FOREIGN PATENT DOCUMENTS

| | | |
|---|---|---|
| JP | 2008-056863 A | 3/2008 |
| JP | 2012-224695 A | 11/2012 |
| JP | 2013-203984 A | 10/2013 |
| JP | 5380864 B2 | 1/2014 |
| JP | 2014-189658 A | 10/2014 |
| JP | 2015-003660 A | 1/2015 |
| JP | 2015-003663 A | 1/2015 |
| JP | 2017-190375 A | 10/2017 |
| WO | WO-2017/170941 A1 | 10/2017 |
| WO | WO-2018/025343 A1 | 2/2018 |
| WO | WO-2018/163612 A1 | 9/2018 |

OTHER PUBLICATIONS

International Searching Authority, "International Search Report," issued in connection with International Patent Application No. PCT/JP2019/038418, dated Dec. 24, 2019.
International Searching Authority, "Written Opinion," issued in connection with International Patent Application No. PCT/JP2019/038418, dated Dec. 24, 2019.
Third Party Observation dated Jan. 25, 2021 for corresponding International Patent Application No. PCT/JP2019/038418.
Office Action on JP 2019-098519 DTD Jun. 24, 2021 (5 pages).

\* cited by examiner

CROSSLINKED POLYOLEFIN RESIN FOAM AND MULTILAYER BODY

CROSS-REFERENCE TO RELATED APPLICATIONS

The present application claims priority under 37 U.S.C. § 371 to International Patent Application No. PCT/JP2019/038418, filed Sep. 27, 2019, which claims priority to and the benefit of Japanese Patent Application No. 2019-098519, filed on May 27, 2019 and Japanese Patent Application No. 2018-185919, filed on Sep. 28, 2018. The contents of these applications are hereby incorporated by reference in their entireties.

TECHNICAL FIELD

The present invention relates to a cross-linked polyolefin resin foam obtained by cross-linking and foaming a polyolefin resin, and a laminated body.

BACKGROUND ART

Being excellent in flexibility, cushioning, sealability and thermal insulation, a foam made of polyolefin resin is used in various industrial fields. For example, a pressure-sensitive adhesive tape obtained by laminating the foam with an adhesive layer is used in an apparatus equipped with a touch panel such as a mobile phone and a smartphone. In such applications, by taking advantage of the flexibility of a foam, a close contact with micro irregularities inside the apparatus is able to be easily achieved. Further, by taking advantage of the flexibility and adhesion of a foam, parts in the apparatus are able to be protected from external factors such as impact and water.

On the other hand, the foam has many internal cells, so that it is difficult to make the foam transparent due to a difference in refractive index of light between the air in the cell and a resin of the foam. Accordingly, unlike in the case of a pressure-sensitive adhesive tape made of transparent base material such as cellophane tape, a pressure-sensitive adhesive tape made of polyolefin resin foam as base material has difficulty in checking a lamination position through the tape, resulting in reduction in production efficiency of electronic apparatuses or the like.

As a foam capable of solving the problem, a polyolefin resin foam having a closed cell structure with a total light transmittance of 15% or more, and shrinkage rates in the longitudinal direction (MD) and the width direction (TD), an average cell size in the longitudinal direction (MD), a thickness, an apparent density, and 25% compressive hardness controlled within specified ranges is proposed in Patent Literature 1. Also, an acrylic resin foam having an average cell size of 1.2 mm or more is proposed in Patent Literature 2. In Patent Literature 1 and 2, the light transmittance of a foam is improved mainly by controlling the average cell size.

Further, an insulating foam made of thermoplastic resin having a total light transmittance of 80% or more, with an expansion ratio of 5 to 100, and an average cell size of 1 to 15 mm is proposed in Patent Literature 3. In Patent Literature 3, the light transmittance of the foam is improved by using a resin having a high total light transmittance such as methylmethacrylate.

CITATION LIST

Patent Literature

Patent Literature 1: JP 2017-190375 A
Patent Literature 2: JP 2013-203984 A
Patent Literature 3: JP 08-067757

SUMMARY OF INVENTION

Technical Problem

A polyolefin resin foam with a thickness more than 0.3 mm, however, has a total light transmittance less than 20%, even with an average cell size controlled as in Patent Literature 1, having room for improvement. On the other hand, in the case of solving the problem of light transparency by using an acrylic resin foam as in Patent Literature 2 or 3, the problem is that an acrylic resin foam is inferior to an electron-beam cross-linked foam such as polyolefin resin foam in mechanical properties and flexibility.

In view of the conventional circumstances, an object of the present invention is to provide a cross-linked polyolefin resin foam having excellent light transmittance.

Further, the foams described in Patent Literature 1 to 3 have a room for improvement in good balance between high light transmittance and flexible tactile feel, for example, in the case of using as a light display component having a function such as displaying information such as temperature, time and vehicle velocity by light in a vehicle such as automobile. Another object of the present invention is, therefore, to provide a laminated body for suitable use as a light display component, having a high light transparency and flexible tactile feel.

Solution to Problems

Through extensive study, the present inventors have found a cross-linked polyolefin resin foam having a high light transparency is able to be obtained by appropriately controlling the expansion ratio, resin components and compounds added to the resin, so that the present invention has been completed.

In other words, the summary of the present invention is described in the following items [1] to [24].

[1] A cross-linked polyolefin resin foam obtained by cross-linking and foaming a polyolefin resin composition comprising a polyolefin resin, the cross-linked polyolefin resin foam having a total light transmittance of 45% or more at the thickness of 0.3 mm or more and less than 1.0 mm, and the cross-linked polyolefin resin foam having a total light transmittance of 30% or more at the thickness of 1.0 mm or more and 5.0 mm or less.

[2] The cross-linked polyolefin resin foam according to item [1], wherein the content of the polyolefin resin is 65 mass % or more based on the total amount of resin components comprised in the polyolefin resin composition.

[3] The cross-linked polyolefin resin foam according to item [1] or [2], wherein the content of one type of the polyolefin resin is 65 mass % or more based on the total amount of resin components comprised in the polyolefin resin composition.

[4] The cross-linked polyolefin resin foam according to any one of items [1] to [3], wherein the polyolefin resin is one or more selected from the group consisting of a polyethylene resin, a polypropylene resin and an ethylene-vinyl acetate copolymer.

[5] The cross-linked polyolefin resin foam according to any one of items [1] to [4], wherein the content of any one of the polyethylene resin, the polypropylene resin and the ethylene-vinyl acetate copolymer is 65 mass % or more based on the total amount of the resin components comprised in the polyolefin resin composition.

[6] The cross-linked polyolefin resin foam according to any one of items [1] to [5], wherein the polyolefin resin composition comprises a nucleating agent.

[7] The cross-linked polyolefin resin foam according to any one of items [1] to [6], wherein the polyolefin resin composition comprises an elastomer.

[8] The cross-linked polyolefin resin foam according to any one of items [1] to [7], wherein the cross-linked polyolefin resin foam has an expansion ratio of 1.3 to 40.

[9] The cross-linked polyolefin resin foam according to any one of items [1] to [8], wherein the cross-linked polyolefin resin foam is used for interior material of an automobile.

[10] A pressure-sensitive adhesive tape comprising the cross-linked polyolefin resin foam according to any one of items [1] to [9] and a pressure-sensitive adhesive material disposed on at least one surface of the foam.

[11] A laminated body comprising the cross-linked polyolefin resin foam according to any one of items [1] to [9] and a surface material disposed on at least one surface of the foam.

[12] A light display component comprising the cross-linked polyolefin resin foam according to any one of items [1] to [9].

[13] A laminated body comprising a skin layer and a foam layer, having an Asker C hardness of 70 or less, and a total light transmittance of more than 0.01%.

[14] The laminated body according to item [13], wherein the skin layer has a thickness of 0.2 to 1.0 mm.

[15] The laminated body according to item [13] or [14], wherein the skin layer has a total light transmittance of 0.02 to 30%.

[16] The laminated body according to any one of items [13] to [15], wherein the foam layer has a thickness of 0.5 to 5 mm.

[17] The laminated body according to any one of items [13] to [16], wherein the foam layer has a total light transmittance of 10% or more.

[18] The laminated body according to any one of items [13] to [17], wherein the foam layer has an expansion ratio of 7 to 40.

[19] The laminated body according to any one of items [13] to [18], wherein the foam layer is a polyolefin foam layer or a polyurethane foam layer.

[20] The laminated body according to any one of items [13] to [19], wherein the laminated body further comprises at least one of a printed layer and a printed film layer.

[21] The laminated body according to item [20], wherein the printed layer is formed by printing a surface of at least either one of the foam layer and the skin layer.

[22] A light display component comprising the laminated body according to any one of items [13] to [21].

[23] The light display component according to item [22], further comprising a sensor element.

[24] The light display component according to item [22] or [23], further comprising a display having a sensor element.

Advantageous Effects of Invention

According to the present invention, a cross-linked polyolefin resin foam having excellent light transparency can be provided.

Further, a laminated body of the present invention has a high light transparency and a flexible tactile feel.

DESCRIPTION OF EMBODIMENTS

Figure 1:
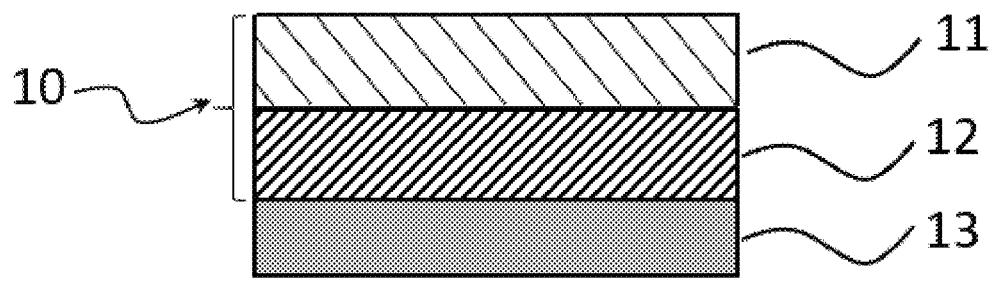
FIG. 1 is a cross-sectional view showing an embodiment of a laminated body of the present invention.

[First Invention]
A first invention in the present invention relates to a cross-linked polyolefin resin foam described below.
[Cross-Linked Polyolefin Resin Foam]
The cross-linked polyolefin resin foam of the present invention is a cross-linked polyolefin resin foam obtained by cross-linking and foaming a polyolefin resin composition containing a polyolefin resin.

The cross-linked polyolefin resin foam of the present invention has a total light transmittance of 45% or more at the thickness of 0.3 mm or more and less than 1.0 mm, and the foam has a total light transmittance of 30% or more at the thickness of 1.0 mm or more and 5.0 mm or less. By controlling the total light transmittance in the range, a cross-linked polyolefin resin foam having an excellent light transparency corresponding to the thickness can be provided.

It is preferable that the cross-linked polyolefin resin foam include a polyolefin resin as main component. Specifically, it is preferable that the content of the polyolefin resin be 65 mass % or more based on the total amount of the resin components contained in a polyolefin resin composition. Although a cross-linked polyolefin resin foam mainly composed of polyolefin resin tends to have a reduced light transparency in general, a cross-linked polyolefin resin foam excellent in total light transmittance can be obtained in the present invention by appropriately controlling the expansion ratio, the resin components, the compounds added to the resin, etc., as described below.
<Total Light Transmittance>

The cross-linked polyolefin resin foam of the present invention (hereinafter also referred to as "foam") has a total light transmittance of 45% or more at the thickness of 0.3 mm or more and less than 1.0 mm. When the foam has a total light transmittance of 45% or more at the thickness of 0.3 mm or more and less than 1.0 mm, the foam has sufficient light transparency for suitable use as a light display component for automobile interior and electronic equipment such as smartphones. From this viewpoint, the total light transmittance of the foam having a thickness of 0.3 mm or more and less than 1.0 mm is preferably 50% or more, more preferably 55% or more, still more preferably 60% or more, particularly preferably 70% or more. The higher the total light transmittance at the thickness of 0.3 mm or more and less than 1.0 mm, the better, and is, for example, 95% or less.

The total light transmittance of the foam having a thickness of 0.3 mm or more and less than 1.0 mm may be controlled in the range by appropriately controlling the expansion ratio, the resin components, the compounds added to the resin, etc. The total light transmittance may be measured by a method described in Example.

The foam of the present invention has a total light transmittance of 30% or more at the thickness of 1.0 mm or more and 5.0 mm or less. When the foam has a total light transmittance of 30% or more at the thickness of 1.0 mm or more and 5.0 mm or less, both of sufficient light transparency and impact absorption are achieved, so that the foam may be suitably used as a light transmitting component for automobile interior and electronic equipment such as a smartphone. From this viewpoint, the total light transmittance of the foam having a thickness of 1.0 mm or more and 5.0 mm or less is preferably 35% or more, more preferably 40% or more, still more preferably 45% or more. The higher the total light transmittance of the foam having a thickness of 1.0 mm or more and 5.0 mm or less, the better, and is, for example, 90% or less. The total light transmittance of the foam having a thickness of 1.0 mm or more and 5.0 mm or less may be controlled in the range by appropriately controlling the expansion ratio, the resin components, the compounds added to the resin, etc.

<Crosslinking Degree (Gel Fraction)>

It is preferable that the crosslinking degree (gel fraction) of the foam of the present invention be 15 to 60 mass %. With a gel fraction equal to or more than the lower limit, the foam tends to have enhanced mechanical strength due to formation of sufficient crosslinking. With a crosslinking degree equal to or less than the upper limit, the foam tends to secure flexibility. From these viewpoints, the crosslinking degree is more preferably 20 to 55 mass %, still more preferably 25 to 50 mass %. The crosslinking degree may be measured by the measurement method described below.

<Expansion Ratio>

The expansion ratio of the foam is preferably 1.3 to 40, more preferably 1.5 to 12, still more preferably 1.8 to 9, furthermore preferably 2.0 to 7. With an expansion ratio equal to or more than the lower limit, the foam has an improved light transparency with improved flexibility and impact absorption resulting from the moderate foaming. Also, although the light transparency tends to improve with increase in the expansion ratio, it is preferable that the expansion ratio be equal to or less than the upper limit to secure the mechanical strength. In the present invention, in parallel with control of the expansion ratio, the type of resin, a nucleating agent, etc., described below are appropriately selected to improve the total light transmittance.

<Apparent Density>

In the present invention, it is preferable that the apparent density of the foam be 0.05 to 0.60 g/cm$^3$. With an apparent density in the range, the foam has improved light transparency with a certain degree of flexibility and mechanical strength imparted to achieve good impact absorption. From these viewpoints, the apparent density is more preferably 0.10 to 0.50 g/cm$^3$, still more preferably 0.15 to 0.40 g/cm$^3$.

<Thickness>

The thickness of the foam of the present invention is 0.3 to 5.0 mm, preferably 0.3 to 2.0 mm, still more preferably 0.3 to 1.5 mm. With a thickness of the foam equal to or more than the lower limit, the light transparency can be improved, while the mechanical strength is maintained. On the other hand, with a thickness of the foam equal to or less than the upper limit, the foam may be used in small electronic equipment such as a smartphone, while the light transparency is maintained.

<25% Compressive Strength>

It is preferable that the 25% compressive strength of the foam be 30 to 200 kPa. With a 25% compressive strength equal to or less than the upper limit, the foam has improved flexibility, and, for example, a pressure-sensitive adhesive tape made therefrom has good followability to an adherend. On the other hand, with a 25% compressive strength equal to or more than the lower limit, good mechanical strength and impact absorption are achieved. From these viewpoints, it is preferable that the 25% compressive strength of the foam be 30 to 150 kPa.

The 25% compressive strength is a value measured by the measurement method in accordance with JIS K6767.

<Polyolefin Resin>

As the polyolefin resin, one or more selected from the group consisting of a polyethylene resin, a polypropylene resin, and an ethylene-vinyl acetate copolymer are preferred. One of these resins may be used alone, or two or more thereof may be used in combination.

It is preferable that the foam of the present invention be mainly composed of polyolefin resin. Specifically, it is preferable that the content of the polyolefin resin be 65 mass % or more based on the total amount of the resin components contained in the polyolefin resin composition. With a content of the polyolefin resin of 65 mass % or more, the mechanical strength, flexibility, etc., of the foam tend to be secured. Also, as described below, the main component resin tends to be easily made of the olefine resin of one type. From these viewpoints, the content of the polyolefin resin is preferably 70 to 100 mass %, more preferably 75 to 100 mass %, based on the total amount of the resin components contained in the foam resin composition. In the following, the base on the total amount of resin components contained in the polyolefin resin composition is simply referred to as "base on the total amount of resin components" in the following.

<<Polyethylene Resin>>

Examples of the polyethylene resin include a low density polyethylene resin (0.93 g/cm$^3$ or less, LDPE), a medium density polyethylene resin (more than 0.930 g/cm$^3$ and less than 0.942 g/cm$^3$, MDPE), and a high density polyethylene resin (0.942 g/cm$^3$ or more, HDPE). Also, preferred specific examples of the low density polyethylene resin include a linear low density polyethylene resin (LLDPE).

In particular, a linear low density polyethylene resin and a high density polyethylene resin are preferred, and a linear low density polyethylene resin (LLDPE) is more preferred. By using these resins, the rate of change of the compressive strength of the foam tends to be easily reduced.

The density of the linear low density polyethylene resin is preferably 0.90 g/cm$^3$ or more, more preferably 0.91 g/cm$^3$ or more and 0.93 g/cm$^3$ or less. Also, the density of the high density polyethylene resin is preferably 0.98 g/cm$^3$ or less, more preferably 0.95 g/cm$^3$ or more and 0.97 g/cm$^3$ or less. With the density of the high density polyethylene resin and the linear low density polyethylene resin controlled in the ranges, the compressive strength tends to be easily reduced without impairment to the flexibility of the foam.

The polyethylene resin may be a homopolymer of ethylene, or may be a copolymer of ethylene as main component (preferably 75 mass % or more, more preferably 90 mass % or more, relative to the all monomers) and a small amount of α-olefin. Examples of the α-olefin include preferably ones having 3 to 12 carbon atoms, more preferably ones having 4 to 10 carbon atoms, specifically 1-butene, 1-pentene, 1-hexene, 4-methyl-1-pentente, 1-heptene, and 1-octene. These α-olefins may be used alone or in combination of two or more thereof to compose the copolymer.

Also, the polyethylene resins may be used alone or in combination of two or more thereof.

<<Polypropylene Resin>>

Examples of the polypropylene resin may be homopolypropylene, which is a homopolymer of propylene, or a copolymer of propylene with a small amount of ethylene and a small amount of α-olefin other than propylene, in which propylene is the main component (preferably 75% by mass or more, and more preferably 90% by mass or more, of all the monomers).

Examples of the copolymer include a block copolymer (block polypropylene), a random copolymer (random polypropylene), and a random block copolymer.

Examples of the α-olefin other than propylene include an α-olefin having about 4 to 10 carbon atoms such as 1-butene, 1-pentene, 1-hexene, 4-methyl-1-pentene, 1-heptene and 1-octene, and in particular, ethylene is preferred from the viewpoints of formability and heat resistance. The α-olefins may be used alone or in combination of two or more to compose the copolymer.

Also, the polypropylene resins may be used alone or in combination of two or more.

In the present invention, any one of a polyethylene resin, a polypropylene resin, and a mixture thereof, that is polymerized using a polymerization catalyst such as a Ziegler-Natta compound, a metallocene compound and a chromium oxide compound, may be used. A foam having high flexibility and high impact absorption is easily made from a polyethylene resin, or a linear low density polyethylene in particular, obtained by using a metallocene compound as polymerization catalyst.

<<Ethylene-Vinyl Acetate Copolymer>>

Examples of the ethylene-vinyl acetate copolymer for use as polyolefin resin include an ethylene-vinyl acetate copolymer containing 50 mass % or more of a constitutional unit derived from ethylene. The ethylene-vinyl acetate copolymer has a high compatibility with a polyethylene resin and a polypropylene resin, so that use of an ethylene-vinyl acetate copolymer and one or more selected from the group consisting of a polyethylene resin and a polypropylene resin in combination improves the light transparency of the foam.

The density of the ethylene-vinyl acetate copolymer is preferably 0.92 g/cm$^3$ or more, more preferably 0.93 g/cm$^3$ or more, still more preferably 0.94 g/cm$^3$ or more, and preferably 0.97 g/cm$^3$ or less, more preferably 0.96 g/cm$^3$ or less. With a density of the ethylene-vinyl acetate copolymer controlled in the range, the foam tends to easily have reduced compressive strength without impairing to the flexibility.

In the present invention, it is preferable that the polyolefin resin composition include any one of the polyolefin resins described above as main component resin. The main component resin refers to 65 mass % or more of any one of a resin contained in polyolefin resins based on the total amount of the resin components. Accordingly, it is preferable that 65 mass % or more of any one of a polypropylene resin, a polyethylene resin and an ethylene-vinyl acetate copolymer be contained.

In general, in blending of two or more resins, the resins are not completely mixed each other, resulting in hazing caused by the mixing. In the present invention, by using a specific one resin (i.e., single resin component) as main component resin, hazing is hardly caused by blending, so that the light transparency of the foam is enhanced.

Among the resins described above as the main component resin, any one of a polypropylene resin and a polyethylene resin is preferred and a polypropylene resin is more preferred. The foam made of polypropylene resin as main component resin has excellent heat resistance, suitably usable as automobile interior material.

More specifically, in the case of using a polypropylene resin as main component resin, the polypropylene resin may be contained in an amount of 65 mass % or more, preferably 75 mass % or more, more preferably 85 mass % or more, most preferably 100 mass %, based on the total amount of the resin components.

Also, it is preferable that one specific resin of the polypropylene resins in amount of 65 mass % or more based on the total amount of the resin components be contained. For example, it is preferable that 65 mass % or more of a block polypropylene, or 65 mass % or more of a random polypropylene be contained, and in this case, the one specific resin in amount of preferably 75 mass % or more, more preferably 85 mass % or more, most preferably 100 mass %, is contained.

In like manner, in the case of using a polyethylene resin as main component resin, the polyethylene resin in amount of 65 mass % or more, preferably 75 mass % or more, still more preferably 85 mass % or more, based on the total amount of the resin components, may be contained.

Also, it is preferable that one specific resin of polyethylene resins in amount of 65 mass % or more based on the total amount of the resin components be contained. For example, it is preferable that 65 mass % or more of LDPE be contained, and in this case, the specific resin is contained in amount of preferably 75 mass % or more, more preferably 85 mass % or more.

In the case of using a polypropylene resin as main component resin, a polypropylene resin alone may be used, or at least one selected from the group consisting of a polyethylene resin and an ethylene-vinyl acetate copolymer may be used in combination, in addition to a polypropylene resin as polyolefin resin.

With single use of a polypropylene resin, compatibilization with another polyolefin resin is not required, so that reduction in transparency resulting from mixing resins to each other is prevented. Also, with combination use of a polypropylene resin and at least one selected from the group consisting of an ethylene-vinyl acetate copolymer and a polyethylene resin improves compatibility, so that good transparency is maintained. Further, the crosslinking degree and the expansion ratio are easily controlled, so that the total light transmittance of the foam can be easily controlled.

In this case, it is preferable that the content of a polypropylene resin be 65 to 95 mass %, and the content of at least one selected from the group consisting of a polyethylene resin and an ethylene-vinyl acetate copolymer be 5 to 35 mass %, based on the total amount of the resin components. Further, it is more preferable that the content of the former be 75 to 95 mass % and the content of the latter be 5 to 25 mass %, and it is still more preferable that the content of the former be 85 to 95 mass % and the content of the latter be 5 to 15 mass %.

Also, it is preferable that the resin for use in combination be any one of a polyethylene resin and an ethylene-vinyl acetate copolymer, and it is more preferable that the resin be an ethylene-vinyl acetate copolymer.

Also, in the case of using a polypropylene resin as main component resin, an elastomer may be further used as described below. In this case, the content of the elastomer is as described below.

On the other hand, in the case of using a polyethylene resin as main component resin, although single use of the polyethylene resin is preferred, at least one selected from the group consisting of a polypropylene resin and an ethylene-vinyl acetate copolymer may be used in combination with the polyethylene resin as polyolefin resin. In single use of a polyethylene resin, however, it is preferable that an elastomer described below be further used, and the content of the elastomer in that case is as follow.

The resin to compose the foam may be made of a polyolefin resin alone or a mixture of a polyolefin resin and an elastomer. By containing an elastomer in the polyolefin resin composition, the crystallinity of the polyolefin resin can be reduced, so that the total light transmittance of the foam is improved. In other words, in the present invention, it is preferable to use an elastomer having a function as a so-called transparentizing agent.

Also, use of an elastomer improves the flexibility and the impact absorption of the foam.

Examples of the elastomer for use include an elastomer having good compatibility with a polyolefin resin, and more specifically an ethylene-propylene-diene rubber (EPDM), an ethylene-propylene rubber (EPM) and a styrene rubber.

Further, examples of the elastomer include a thermoplastic elastomer. Examples of the thermoplastic elastomer include an olefin thermoplastic elastomer and a styrene thermoplastic elastomer.

As the elastomer, one of the components described above may be used alone or two or more may be used in combination. From the viewpoint of easy control of the total light transmittance of the foam in the range, a styrene rubber, an olefin thermoplastic elastomer, and a styrene thermoplastic elastomer are preferred, and in particular, a styrene rubber and a styrene thermoplastic elastomer are more preferred.

Examples of the styrene rubber include various types of polymers such as a random copolymer of styrene and a conjugated diene compound, and a hydrogenated product thereof. Specific examples include a styrene-butadiene copolymer (SBR) and a hydrogenated product thereof (HSBR).

Examples of the olefin thermoplastic elastomer include a blended type and a dynamically cross-linked type, and more specifically a thermoplastic elastomer composed of a hard segment made of a thermoplastic crystalline polyolefin such as polypropylene and polyethylene and a soft segment made of a completely vulcanized or partially vulcanized rubber. Examples of the soft segment component include a butyl rubber, a halobutyl rubber, EPDM, EPM, an acrylonitrile/butadiene rubber, NBR and a natural rubber, and it is preferable to use EPDM.

Further, examples of the olefin thermoplastic elastomer include a block copolymer type. Examples of the block copolymer type include one having a crystalline block and a soft segment block, and more specific examples include a crystalline olefin block-ethylene/butylene copolymer-crystalline olefin block copolymer (CEBC). In CEBC, it is preferable that the crystalline olefin block be a crystalline ethylene block, and examples of a commercial product of such CEBC include "DYNARON 6200P" manufactured by JSR Corporation.

Examples of the styrene thermoplastic elastomer include a block copolymer having a polymer or copolymer block of styrene and a polymer or copolymer block of a conjugated diene compound. Examples of the conjugated diene compound include isoprene and butadiene.

The styrene thermoplastic elastomer for use in the present invention may be hydrogenated or may not be hydrogenated. In the case of performing hydrogenation, the hydrogenation may be performed by a known method.

Examples of the styrene thermoplastic elastomer include a normal block copolymer such as a styrene-isoprene block copolymer, a styrene-isoprene-styrene block copolymer, a styrene-butadiene block copolymer, a styrene-butadiene-styrene block copolymer, a styrene-ethylene/butylene-styrene block copolymer (SEBS), a styrene-ethylene/propylene-styrene block copolymer (SEPS), a styrene-ethylene/butylene block copolymer (SEB), a styrene-ethylene/propylene block copolymer (SEP), and a styrene-ethylene/butylene-crystalline olefin copolymer (SEBC).

As the styrene thermoplastic elastomer described above, a block copolymer is preferred, and in particular, SEBC is more preferred. By using such an elastomer in combination with a polyolefin resin, and further controlling the expansion ratio, the light transparency of the foam is able to be improved.

Examples of a commercial product of the styrene thermoplastic elastomer include "DYNARON 1320P" (product name, styrene content: 10 mass %) manufactured by JSR Corporation, "DYNARON 8600P" (product name, styrene content: 15 mass %), and "DYNARON 4600P" (product name, styrene content: 20 mass %).

In the present invention, in the case of using a polyolefin resin and an elastomer in combination as resin components, the content of the elastomer based on the resin components is preferably 5 to 30 mass %, more preferably 8 to 22 mass %. With a content of the elastomer in the ranges, the light transparency of the foam may be further improved while maintaining the mechanical strength of the foam.

<Nucleating Agent>

It is preferable that the polyolefin resin composition of the present invention contain a nucleating agent. The nucleating agent for use in the present invention is not particularly limited, as long as the agent has an effect for improving the progress rate in a generation step of crystal nuclei. By addition of a nucleating agent to a polyolefin resin such as a polyethylene resin and a polypropylene resin, the size of crystals generated can be reduced, so that the transparency of the foam is improved.

Examples of the nucleating agent for use in the present invention, having an effect for enhancing the progress rate in a generation step of crystal nuclei, include a material having an effect for facilitating the orientation of molecular chains through an adsorption step of the molecular chains of a polymer.

More specifically, examples include a high melting point polymer, an organic carboxylic acid or a metal salt thereof, aliphatic alcohols, dibenzylidene sorbitol or a derivative thereof, a partial metal salt of rosin acid, an amide compound, an inorganic fine particle, an organic phosphoric acid compound or a metal salt thereof, imides, quinacridones, quinones, an aromatic sulfonate or a metal salt thereof, saccharides, and a mixture thereof. These may be used alone or in combination of two or more.

Examples of the high melting point polymer include a polyolefin such as poly(3-methyl-1-pentene) and poly(3-methyl-1-butene), a polyvinyl cycloalkane such as polyvinyl cyclohexane and polyvinyl cyclopentane, syndiotactic polystyrene, and polyalkenylsilane.

Examples of the organic carboxylic acid and the metal salt thereof include benzoic acid, p-t-butylbenzoate, adipic acid, thiophene carboxylic acid, pyrrole carboxylic acid, aluminum benzoate, aluminum p-t-butylbenzoate, sodium adipate, sodium thiophenecarbozylate, and sodium pyrolle carboxylate.

Examples of the dibenzylidene sorbitol and the derivative thereof include dibenzylidene sorbitol, 1,3:2,4-bis(o-3,4-dimethyl benzylidene)sorbitol, 1,3:2,4-bis(o-2,4-dimethyl benzylidene)sorbitol, 1,3:2,4-bis(o-4-ethyl benzylidene)sorbitol, 1,3:2,4-bis(o-4-chloro benzylidene)sorbitol, and 1,3:2,4-dibenzylidene sorbitol. Examples of a commercial product of dibenzylidene sorbitol and a derivative thereof include GEL ALL MD and GEL ALL MD-R (product names) manufactured by New Japan Chemical Co., Ltd.

Examples of the partial metal salt of rosin acid include PINECRYSTAL KM 1600, PINECRYSTAL KM 1500, and PINECRYSTAL KM 1300 (product names) manufactured by Arakawa Chemical Industries, Ltd.

Examples of the amide compound include dianilide adipate and dianilide suberate.

Examples of the inorganic fine particle include talc, clay, mica, asbestos, glass fiber, glass flake, glass beads, calcium silicate, montmorillonite, bentonite, graphite, aluminum powder, alumina, silica, diatomite, titanium oxide, magnesium oxide, pumice powder, pumice balloon, aluminum hydroxide, magnesium hydroxide, basic magnesium carbonate, dolomite, calcium sulfate, potassium titanate, barium sulfate, calcium sulfite and molybdenum sulfide.

As the metal salt of organic phosphoric acid, a metal salt of organic phosphoric acid represented by the following general formula (1) is preferred due to having less smell.

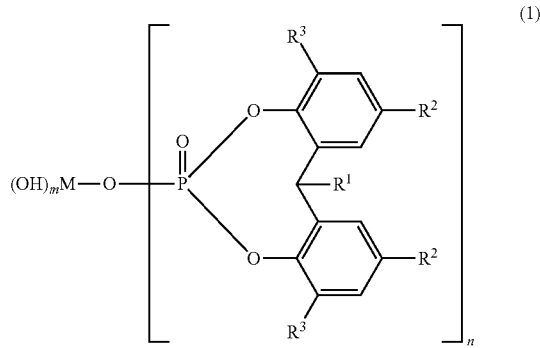

wherein $R^1$ represents a hydrogen atom or an alkyl group having 1 to 4 carbon atoms, $R^2$ and $R^3$ each represent a hydrogen atom, an alkyl group having 1 to 12 carbon atoms, cycloalkyl group, an aryl group or an aralkyl group. M represents one selected from the group consisting of an alkaline metal, an alkaline earth metal, aluminum and zinc. In the case where M is an alkaline metal, m represents 0, and n represents 1, respectively. In the case where M is an alkaline earth metal or zinc, n represents 1 or 2, and in the case where n is 1, m represents 1, and in the case where n is 2, m represents 0. In the case where M is aluminum, m represents 1 and n represents 2, respectively.

Examples of a commercial product of the metal salt of organic phosphoric acid include ADEKASTAB NA-11 and ADEKASTAB NA-21 manufactured by ADEKA Corporation.

Among nucleating agents, saccharides are preferred from the viewpoints of compatibility with olefins and transparency. Examples of the saccharides include sorbitol, nonitol and xylitol, and use of one or more selected therefrom as nucleating agents is more preferred.

In the case of using a nucleating agent in the present invention, the content of the nucleating agent in the polyolefin resin composition is preferably 0.5 to 10 parts by mass, more preferably 1.5 to 8 parts by mass, still more preferably 2 to 7 parts by mass, relative to 100 parts by mass of the polyolefin resin. With a content of the nucleating agent equal to or more than the lower limit, the transparency of the foam improves. On the other hand, with a content of the nucleating agent equal to or less than the upper limit, the transparency of the foam is able to be improved while suppressing the production cost.

Although the polyolefin resin composition of the present invention may have both of the nucleating agent and the elastomer, it is preferable that the composition have either one thereof. Due to having either one thereof, the composition enables the light transparency to be effectively improved.

<Foaming Agent>

The foam of the present invention is obtained by foaming a polyolefin resin composition containing a polyolefin resin-containing resin, a foaming agent, etc. As the foaming agent, a thermally decomposable foaming agent is preferred.

As the thermally decomposable foaming agent, an organic foaming agent and an inorganic foaming agent are usable. Examples of the organic foaming agent include an azo compound such as azodicarbonamide, a metal salt of azodicarboxylic acid (barium azodicarboxylate, or the like), and azobisisobutyronitrile, a nitroso compound such as N,N'-dinitroso pentamethylene tetramine, a hydrazine derivative such as hydrazine carbonamide, 4,4'-oxybis(benzene sulfonyl hydrazide), and toluene sulfonyl hydrazide, and a semicarbazide compound such as toluene sulfonyl semicarbazide.

Examples of the inorganic foaming agent include ammonium carbonate, sodium carbonate, ammonium hydrogen carbonate, sodium hydrogen carbonate, ammonium nitrite, sodium borohydride, and anhydrous monosodium citrate.

In particular, an azo compound is preferred and azodicarbonamide is more preferred from the viewpoints of obtaining fine cells, economy and safety.

The thermally decomposable foaming agents may be used alone or in combination of two or more.

The content of the foaming agent in the polyolefin resin composition is preferably 1 to 30 parts by mass, more preferably 2 to 25 parts by mass, still more preferably 2 to 20 parts by mass, relative to 100 parts by mass of the polyolefin resin. With an amount of the foaming agent compounded of 1 part by mass or more, the expandable sheet is moderately foamed, so that moderate flexibility and impact absorption can be imparted to the foam. With an amount of foaming agent compounded of 30 parts by mass or less, the foam is prevented from being excessively foamed, so that good mechanical strength of the foam can be achieved.

<Additive>

The polyolefin resin composition may include a component such as a crosslinking aid, a decomposition temperature conditioner, and an antioxidant.

As the crosslinking aid, a multifunctional monomer may be used. By adding a crosslinking aid to the polyolefin resin, the ionizing radiation dose irradiated in a step (2) described below is reduced to prevent cleavage and deterioration of resin molecules irradiated with the ionizing radiation.

Specific examples of the crosslinking aid include a compound having three functional groups in a molecule such as trimethylolpropane trimethacrylate, trimethylolpropane triacrylate, trimellitic acid triallyl ester, 1,2,4-benzenetricarboxylic acid triallyl ester, and triallyl isocyanurate, a compound having two functional groups in a molecule such as 1,6-hexanediol dimethacrylate, 1,9-nonanediol dimethacrylate, 1,10-decanediol dimethacrylate, and divinylbenzene, diallyl phthalate, diallyl terephthalate, diallyl isophthalate, ethylvinyl benzene, neopentyl glycol dimethacrylate, lauryl methacrylate, and stearyl methacrylate.

These crosslinking aids may be used alone or in combination of two or more.

The amount of the crosslinking aid added is preferably 0.5 to 10 parts by mass, more preferably 1.0 to 8 parts by mass, still more preferably 1.5 to 5 parts by mass, relative to 100 parts by mass of the polyolefin resin. With an amount added of 0.5 parts by mass or more, the foam is able to stably obtain a desired crosslinking degree, and with an amount added of 10 parts by mass or less, the control of the crosslinking degree of the foam is easily performed.

In the polyolefin resin composition, a decomposition temperature conditioner may be compounded. The decomposition temperature conditioner is compounded to decrease the decomposition temperature of a thermally decomposable foaming agent or enhance the decomposition rate of the agent.

Specific examples of the conditioner compound include zinc oxide, zinc stearate, and urea. In order to control the surface conditions of the foam, the decomposition temperature conditioner in an amount of, for example, 0.01 to 5 parts by mass relative to 100 parts by mass of the polyolefin resin is compounded.

In the polyolefin resin composition, an antioxidant may be compounded. Examples of the antioxidant include a phenol antioxidant such as 2,6-di-t-butyl-p-cresol and pentaerythritol tetrakis[3-(3,5-di-t-butyl-4-hydroxyphenyl)propionate], a sulfur antioxidant such as dilauryl thiodipropionate, a phosphorus antioxidant, and an amine antioxidant. The antioxidant in an amount of, for example, 0.01 to 5 parts by mass is compounded relative to 100 parts by mass of the polyolefin resin.

In the polyolefin resin composition, an additive other than those described above that is usually used in a foam such as a heat stabilizer, a colorant, a fire retardant, an antistatic agent, and a filler may be compounded.

[Production Method of Foam]

The production method of a foam of the present invention is not particularly limited, and the foam is produced by heating an expandable sheet made of a polyolefin resin composition containing at least a resin and a thermally decomposable foaming agent so as to foam the thermally decomposable foaming agent. More specifically, it is preferable that the production method include the following steps (1) to (3):

Step (1): a step of forming an expandable sheet made of a polyolefin resin composition containing at least a resin and a thermally decomposable foaming agent;

Step (2): a step of irradiating an ionizing radiation to the expandable sheet to cause crosslinking in the expandable sheet; and Step (3): a step of heating the cross-linked expandable sheet to foam the thermally decomposable foaming agent, so that a foam is obtained.

In the step (1), the method for forming an expandable sheet is not particularly limited, and forming may be performed by, for example, supplying a resin and an additive to an extruder, melt-kneading the mixture, and extruding a polyolefin resin composition from the extruder into a sheet form. Alternatively, the foam may be formed by pressing a polyolefin resin composition.

The forming temperature of the expandable sheet (i.e., temperature during extrusion or temperature during pressing) is preferably 50° C. or more and 250° C. or less, more preferably 80° C. or more and 180° C. or less.

In the step (2), as the method for cross-linking the polyolefin resin composition, a method for irradiating an ionizing radiation such as an electron beam, an α ray, a β ray, and a γ ray to the expandable sheet may be used. The dose of the ionizing radiation may be controlled such that the crosslinking degree of the resulting foam is in the desired range described above, being preferably 1 to 12 Mrad, more preferably 1.5 to 8 Mrad.

In the step (3), the heating temperature during foaming of the thermally decomposable foaming agent by heating the polyolefin resin composition may be equal to or more than the foaming temperature of the thermally decomposable foaming agent, being preferably 200 to 300° C., more preferably 220 to 280° C.

In the present production method, the foam may be stretched in either one or both of MD and TD. Stretching of the foam may be performed after obtaining the foam by foaming the expandable sheet, or may be performed during foaming the expandable sheet. In the case where the foam is stretched after obtaining the foam by foaming the expandable sheet, the foam may be subsequently stretched while maintaining the melting state at the time of foaming without cooling of the foam, or the foam may be cooled and then reheated into a molten or softened state so as to be stretched. The foam is easily thinned by stretching. During stretching, the foam may be heated to, for example, 100 to 280° C., preferably 150 to 260° C. In the present invention, by stretching of the foam, the cell size of the foam increases along either one or both of MD and TD, so that the light transparency tends to be enhanced.

In the present production method, however, a foam may be obtained by a method other than the method described above, without limitation to the above. For example, instead of exposure to ionizing radiation, crosslinking may be performed by a method including compounding an organic peroxide in a polyolefin resin composition in advance and heating an expandable sheet to decompose the organic peroxide.

Also, in the present production of a foam, the resulting foam may be sliced to obtain a desired thickness.

[Use of Foam]

The foam of the present invention may be suitably used in various electronic equipment and automobile interior materials. Use for automobile interior materials is more preferred. Examples of the electronic equipment include a mobile phone such as smartphone, a game machine, an electronic notebook, a tablet PC, and a laptop computer.

The foam may be used inside of various electronic equipment as, for example, a sealant and an impact absorbing material. Due to excellence in light transparency, the foam of the present invention allows a lamination position to be checked through a foam sheet, so that bonding to various electronic parts can be achieved at a high positioning accuracy.

Also, the foam of the present invention is suitably used as a light display component. The light display component has a light source such as light emitting diode (LED) disposed on one surface (i.e., rear side) and light is emitted from the light source toward the foam, so that the light transmits through the foam and various information is displayed on the other surface (i.e., front side) of the foam by the light from the light source.

Also, the foam may be made into a laminated body with another component laminated thereon. Specifically, it is preferable that the laminated body have the foam of the present invention and a surface material disposed on at least one surface of the foam. Such a laminated body is usable in any of electronic equipment and automobile interior, and it is preferable that the laminated body be used for automobile interior.

Also, it is preferable that the laminated body be used as a light display component. In the light display component, from a light source such as light emitting diode (LED) disposed on the rear side of the foam, light is emitted such that the light transmits through the foam and a surface material to display various information (e.g., vehicle velocity) on the surface material. Further, in the case where geometrically patterned irregularities are disposed on the surface material, the transmitted light comes to the surface in a geometric pattern, so that the design of automobile interior can be improved.

The surface material of automobile interior is also referred to as skin material. Specific examples of the surface material include a resin sheet such as a polyvinyl chloride sheet, a resin mixture of polyvinyl chloride and ABS resin, and a thermoplastic elastomer sheet, a fabric, knitting and nonwoven fabric made of natural fiber or synthetic fiber, and leathers such as artificial leather and synthetic leather. The surface material may have geometrically patterned irregularities in appropriate manner. Among those, a resin sheet is preferred, and it is more preferable that the resin sheet have light transparency. Use of a resin sheet having light transparency allows various information to be displayed on the surface material by the light from the light source described above. Also, the use allows the light transparency to be imparted to the whole laminated body.

The thickness of the surface material is not particularly limited, being, for example, 0.1 to 5 mm, preferably 0.2 to 2 mm, more preferably 0.2 to 1 mm.

With a thickness of the surface material in these ranges, the surface material is able to have high mechanical strength with high transparency secured. With a thickness of the surface material of 0.2 mm or more, the inside including the foam is prevented from being seen through.

The total light transmittance of the surface material is not particularly limited, preferably 0.02 to 30%. With a total light transmittance of the surface material of 0.02% or more, the total light transmittance of the whole laminated body is easily controlled to a certain level or more. With a total light transmittance of the surface material of 30% or less, the inside including the foam is prevented from being seen through from the surface material side. The total light transmittance of the surface material is preferably 0.05 to 25%, more preferably 0.1 to 22%.

Examples of the method for bonding the surface material include an extrusion lamination method, an adhesive lamination method in which bonding is performed after application of an adhesive, a thermal lamination method (heat fusion method), a hot melt method, and a high-frequency welding method, and any method may be employed so long as both are bonded to each other.

Also, in the case of using as automobile interior material, the foam and the laminated body having the foam may be appropriately formed into a desired shape. Examples of the forming method include vacuum forming, compression molding and stamping.

[Pressure-Sensitive Adhesive Tape]

The pressure-sensitive adhesive tape of the present invention includes the foam of the present invention as base material, with a pressure-sensitive adhesive material disposed on one or both surfaces of the foam. The thickness of the pressure-sensitive adhesive tape is usually about 0.5 to 2.0 mm.

The thickness of the pressure-sensitive adhesive material of the pressure-sensitive adhesive tape is preferably 50 to 200 μm, more preferably 80 to 150 μm. With a thickness of the pressure-sensitive adhesive material of the pressure-sensitive adhesive tape of 50 to 200 μm, the thickness of the pressure-sensitive adhesive tape is able to be reduced, so that the light transparency can be improved.

The pressure-sensitive adhesive material may be one having at least one pressure-sensitive adhesive layer, including a single pressure-sensitive adhesive layer laminated on at least one surface of the foam and a pressure-sensitive adhesive double coated sheet attached to at least one surface of the foam, and from the viewpoint of light transparency, a single pressure-sensitive adhesive layer is preferred. The pressure-sensitive adhesive double coated sheet has a base material and pressure-sensitive adhesive layers disposed on both sides of the base material. The pressure-sensitive adhesive double coated sheet is used to make bonding between one pressure-sensitive adhesive layer and a resin foam sheet, and to make bonding between the other pressure-sensitive adhesive layer and another component.

The pressure-sensitive adhesive to compose the pressure-sensitive adhesive layer is not particularly limited, and, for example, an acrylic adhesive, a urethane adhesive, a rubber adhesive and a silicone adhesive may be used. Also, on the pressure-sensitive adhesive, a release sheet such as mold releasing paper may be further bonded.

The pressure-sensitive adhesive tape made from the foam of the present invention may be used as an impact absorbing material, sealing material, etc., that are disposed inside of a body of electronic equipment. Alternatively, the foam may be attached to the surface material described above through the adhesive layer of the pressure-sensitive adhesive tape.

[Second Invention]

A second invention of the present invention relates to a laminated body described below.

[Laminated body]

The second invention of the present invention relates to a laminated body having a skin layer and a foam layer, wherein the laminated body has an Asker C hardness of 70 or less, and a total light transmittance of more than 0.01%.

In FIG. 1, a cross-sectional view of a laminated body in an embodiment of the present invention is shown. The laminated body of the present invention is a laminated body 10 having a skin layer 11 and a foam layer 12, wherein the skin layer 11 is laminated on one surface of the foam layer 12. In the case where the laminated body 10 is used, for example, as interior material of an automobile, the skin layer 11 made of, for example, resin sheet is laminated on the foam layer 12 to give a premium feel to a user (e.g., driver).

Also, on another surface side of the foam layer 12, an LED 13 is disposed, which displays necessary information such as temperature, time, vehicle velocity, etc., by emission in a vehicle such as automobile. The light emitted from the LED 13 transmits through the foam layer 12 and the skin layer 11, so that a human can detect necessary information from the skin layer 11 side. Although the LED 13 is shown in a layered form in drawing, the layered form is not necessarily required. Also, although the LED 13 in contact with the foam layer and the like is shown in drawing, the LED 13 may be disposed at a certain distance away from the foam layer and the like.

The laminated body 10 of the present invention has a total light transmittance equal to or more than a certain level, so that a human easily detects necessary information. Further, the laminated body has a flexible tactile feel due to having an Asker C hardness equal to or less than a certain level. Although an aspect in which the skin layer 11 and the foam layer 12 are directly layered is shown in FIG. 1, an adhesive layer not shown in drawing may be disposed between the skin layer 11 and the foam layer 12.

Figure 2:
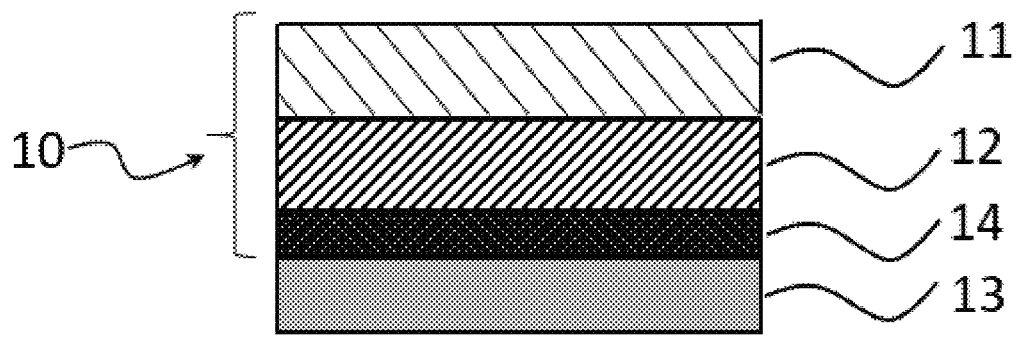
FIG. 2 is a cross-sectional view showing another embodiment of a laminated body of the present invention.
Figure 4:
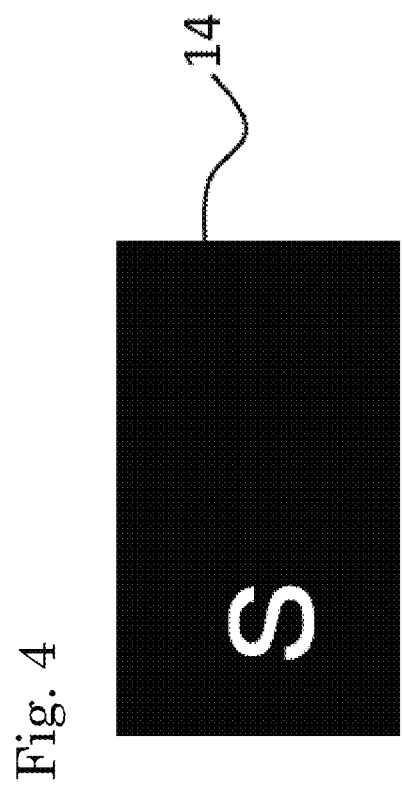
FIG. 4 is a top view showing an example of the printed layer in the present invention.

Another embodiment of the laminated body of the present invention is shown in FIG. 2. A laminated body 10 shown in FIG. 2 further has a printed layer 14. More specifically, the laminated body 10 has a skin layer 11, a foam layer 12 and a printed layer 14 laminated in this order, and an LED 13 is disposed on a surface side of the printed layer 14 opposite to the surface where the foam layer 12 is present. The printed layer 14 has a light-shielding portion for shielding from the light emitted from the LED 13 and a light-transmitting portion through which light transmits. The light-transmitting portion is made into certain character shapes, so that necessary information is checked from the skin layer side by the light from the LED 13. An example of the top view of the printed layer 14 is shown in FIG. 4, wherein a black portion is the light-shielding portion, and a white outlined portion is the light-transmitting portion. In this case, the white outlined portion (S-shape) is detected from the skin layer side.

Although the printed layer 14 is a layer formed on the surface of the foam layer 12 by a known method in FIG. 2, the aspect for forming the printed layer 14 is not limited thereto, and the printed layer 14 may be formed by printing at least either of the surfaces of the foam layer 12 and the skin layer 11.

Alternatively, a printed film layer having at least one printed surface of a film may be used instead of the printed layer 14. The printed film layer also has a light-shielding portion that shields light and a light-transmitting portion through which light transmits in the same manner. In other words, the laminated body 10 may have at least either one of the printed layer and the printed film layer to display the information corresponding to the shape of the light-transmitting portion of the printed layer or the printed film layer.

Figure 3:
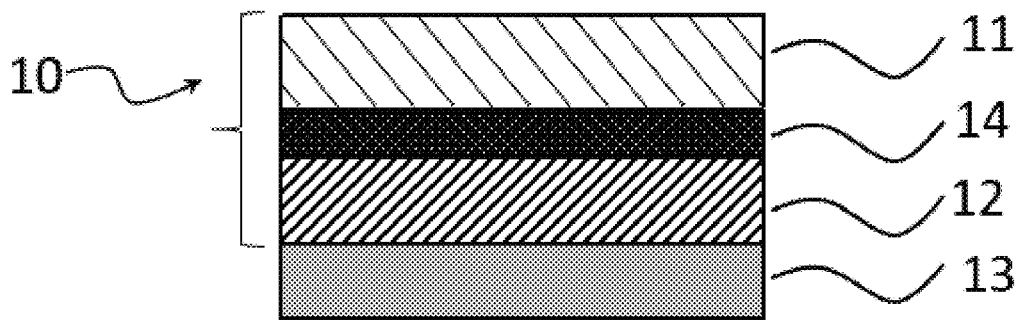
FIG. 3 is a cross-sectional view showing another embodiment of a laminated body of the present invention.

Alternatively, such a printed layer 14 may be disposed between the skin layer 11 and the foam layer 12 as shown in FIG. 3. Also, the laminated body 10 in FIG. 2 or 3, an adhesive layer not shown in drawing may be disposed between each of the layers.

(Total Light Transmittance of Laminated Body)

The total light transmittance of the laminated body having the skin layer and the foam layer in the present invention is more than 0.01%. With a total light transmittance of 0.01% or less, the laminated body has poor light transparency, so that it becomes difficult to visually recognize necessary information from the skin layer side. The total light transmittance of the laminated body is preferably 0.02% or more, more preferably 0.5% or more, still more preferably 1% or more. It is also preferable that when the laminated body is exposed to light from an LED as described above, necessary information be detected from the skin layer side, and it is preferable that when the laminated body is not exposed to light, the inner part including the foam layer, the printed layer and printed film layer be not shown through. From this viewpoint, the total light transmittance of the laminated body is preferably 5% or less, more preferably 4% or less, still more preferably 3% or less.

The total light transmittance of a laminated body means the maximum total light transmittance of the laminated body in the case where the laminated body has at least either one of a printed layer and a printed film layer. In other words, the printed layer and the printed film layer have a light-shielding portion and a light-transmitting portion as described above, and the maximum total light transmittance of a laminated body is the total light transmittance of the light-transmitting portion as measuring object.

The total light transmittance of a laminated body may be controlled by the thickness of the skin layer and the foam layer, the composition, etc., as described below.

(Asker C Hardness of Laminated Body)

The laminated body in the present invention has an Asker hardness of 70 or less. With an Asker C hardness of a laminated body of more than 70, it becomes difficult for the laminated body to maintain the flexible tactile feel. The Asker C hardness of a laminated body is preferably 60 or less, more preferably 50 or less, still more preferably 40 or less. Also, although the lower limit of the Asker C hardness is not particularly limited, the Asker C hardness of a laminated body is preferably 5 or more, more preferably 10 or more, from the viewpoint of maintaining a certain level of mechanical strength. The Asker C hardness of a laminated body may be controlled by the thickness, the expansion ratio, etc., of the foam layer.

(Skin Layer)

The thickness of a skin layer is preferably 0.2 to 1.0 mm, though not particularly limited so long as the total light transmittance and the Asker hardness C of the laminated body are in the range described above. With the thickness of the skin layer controlled to 1.0 mm or less, the total light transmittance and the Asker C hardness of the laminated body are easily controlled in the range described above. Also, with the thickness of the skin layer controlled to 0.2 mm or more, the inner part including the foam layer, and the printed layer and the printed film layer that are disposed on an as needed basis is easily prevented from being shown through. The thickness of the skin layer is more preferably 0.2 to 0.8 mm, still more preferably 0.2 to 0.7 mm.

It is preferable that the total light transmittance of a skin layer be 0.02 to 30%. With a total light transmittance of a skin layer of 0.02% or more, the total light transmittance of the laminated body is easily controlled to a certain level or more as described above. With a total light transmittance of a skin layer of 30% or less, the inner part including the foam layer, and the printed layer and the printed film layer that are disposed on an as needed basis is easily prevented from being shown through. The total light transmittance of a skin layer is preferably 0.05 to 25%, more preferably 0.1 to 22%.

A skin layer may contain a pigment such as carbon black, titanium dioxide, pearl particles, metal powder such as aluminum powder from the viewpoint of controlling the total light transmittance to a desired value. It is preferable that a skin layer contain a resin sheet and a pigment described below. The content of the pigment in a skin layer is preferably 0.01 to 3 mass %, more preferably 0.02 to 1 mass %, based on the total amount of skin layer.

The material to compose a skin layer is not particularly limited, and examples thereof include a resin sheet such as a polypropylene sheet, a polyethylene sheet, an olefin thermoplastic elastomer (TPO) sheet, a polyvinyl chloride sheet, and a resin mixture sheet made of polyvinyl chloride and ABS resin, a fabric, knitting and nonwoven fabric made of natural fiber or synthetic fiber, and a leather made of artificial leather of synthetic leather.

Among those, a resin sheet is preferred from the viewpoint of easy control of the total light transmittance in a desired range. In particular, a polypropylene sheet and an olefin thermoplastic elastomer sheet are preferred, and an olefin thermoplastic elastomer sheet is more preferred.

In order to improve the design, an embossed pattern may be formed on the surface of a skin layer. Using a silicone stamper having irregularities transferred from real leather, stone, wood, etc., a lenticel pattern, a grain pattern, etc., may be drawn on the surface of a skin layer.

Also, from the viewpoint of preventing scratches, various types of coating may be applied to the surface of a skin layer.

(Foam Layer)

A foam layer to compose the laminated body of the present invention is described as follows.

<Thickness>

The thickness of a foam layer is preferably 0.5 to 5 mm, though not particularly limited so long as the total light transmittance and the Asker C hardness of a laminated body is controlled in the range described above. With a thickness of the foam layer controlled to 0.5 mm or more, the laminated body tends to have a flexible tactile feel. Also, with a thickness of the foam layer controlled to 5 mm or less, the total light transmittance of a laminated body is easily controlled in the range described above. The thickness of the foam layer is preferably 0.5 to 4 mm, more preferably 0.6 to 3.5 mm.

<Total Light Transmittance>

It is preferable that the total light transmittance of a foam layer be 10% or more. With a total light transmittance of a foam layer of 10% or more, the total light transmittance of a laminated body is easily controlled in the range described above. The total light transmittance of a foam layer is more preferably 20% or more, still more preferably 30% or more. The total light transmittance of a foam layer is usually 95% or less, though the higher the transmittance is, the better.

<Expansion Ratio>

It is preferable that the expansion ratio of a foam layer be 7 to 40, though not particularly limited. With an expansion ratio of 7 or more, the Asker C hardness of a laminated body decreases to easily obtain a flexible tactile feel, and the total light transmittance of a laminated body is easily controlled in the range described above. With an expansion ratio of a foam layer controlled to 40 or less, a laminated body may have a mechanical strength at a certain level or more. The expansion ratio of a foam layer is more preferably 10 to 35, still more preferably 12 to 33.

<Crosslinking Degree (Gel Fraction)>

It is preferable that the crosslinking degree (gel fraction) of a polyolefin foam layer be 5 to 60 mass %. With a gel fraction equal to or more than the lower limit, sufficient crosslinking is formed in the foam layer, so that the mechanical strength tends to be enhanced. With a crosslinking degree equal to or less than the upper limit, a flexible tactile feel tends to be secured. From these viewpoints, the crosslinking degree is more preferably 10 to 50 mass %, still more preferably 10 to 40 mass %. The crosslinking degree may be measured by the measurement method described below.

<Material>

It is preferable that a foam layer be formed of resin, and specifically a polyolefin foam layer and a polyurethane foam layer are preferred, and a polyolefin foam layer is more preferred. A polyolefin foam layer is formed by foaming an expandable resin composition containing a polyolefin resin. Examples of the polyolefin resin include a polypropylene resin, a polyethylene resin, and an ethylene-vinyl acetate copolymer, which may be used alone or in combination of two or more.

It is preferable that the resin to form a foam layer be composed of one type alone. Use of one type alone is less apt to cause hazing resulting from blending, so that the light transparency of the foam layer is enhanced.

The foam layer may be a single-layered foam layer or a multi-layered foam layer including two or more foams laminated. The individual foams to compose a multi-layered foam layer may have physical properties different from each other, including the composition, thickness, total light transmittance, expansion ratio and crosslinking degree. It is preferable that the multi-layered foam layer as a whole satisfy each of the physical properties.

<<Polyethylene Resin>>

Examples of the polyethylene resin include a low density polyethylene resin (0.93 g/cm$^3$ or less, LDPE), a medium density polyethylene resin (more than 0.930 g/cm$^3$ and less than 0.942 g/cm$^3$, MDPE), and a high density polyethylene resin (0.942 g/cm$^3$ or more, HDPE). Also, preferred specific examples of the low density polyethylene resin include a linear low density polyethylene resin (LLDPE).

The polyethylene resin may be a homopolymer of ethylene or a copolymer of ethylene and a small amount of α-olefin, including ethylene as main component (preferably 75 mass % or more, more preferably 90 mass % or more, in the total amount of monomers). Examples of the α-olefin include preferably one having 3 to 12 carbon atoms, more preferably one having 4 to 10 carbon atoms, more specifically 1-butene, 1-pentene, 1-hexene, 4-methyl-1-pentene, 1-heptene, and 1-octene. In the copolymer, these α-olefins may be used alone or in combination of two or more.

Also, the polyethylene resins may be used alone or in combination of two or more.

<<Polypropylene Resin>>

Examples of the polypropylene resin may be homopolypropylene, which is a homopolymer of propylene, or a copolymer of propylene and a small amount of ethylene, or a copolymer of propylene and a small amount of α-olefin other than propylene, in which propylene is the main component (preferably 75% by mass or more, and more preferably 90% by mass or more, of all the monomers).

Examples of the copolymer include a block copolymer (block polypropylene), a random copolymer (random polypropylene), and a random block copolymer.

Examples of the α-olefin other than propylene include an α-olefin having about 4 to 10 carbon atoms such as 1-butene, 1-pentene, 1-hexene, 4-methyl-1-pentene, 1-heptene, and 1-octene, and in particular, ethylene is preferred from the viewpoints of formability and heat resistance. In the copolymer, these α-olefins may be used alone or in combination of two or more.

Also, the polypropylene resins may be used alone or in combination of two or more.

In the present invention, any of a polyethylene resin, a polypropylene resin and a mixture thereof that are obtained by polymerization using a polymerization catalyst such as a Ziegler-Natta compound, a metallocene compound, and a chromium oxide compound, may be used.

<<Ethylene-Vinyl Acetate Copolymer>>

Examples of an ethylene-vinyl acetate copolymer for use as the polyolefin resin include an ethylene-vinyl acetate copolymer containing a constitutional unit derived from ethylene in an amount of 50 mass % or more. Since an ethylene-vinyl acetate copolymer has a high compatibility with a polyethylene resin and a polypropylene resin, one or more selected from the group consisting of an ethylene-vinyl acetate copolymer, a polyethylene resin and a polypropylene resin may be used in combination.

The density of an ethylene-vinyl acetate copolymer is preferably 0.92 g/cm$^3$ or more, more preferably 0.93 g/cm$^3$ or more, still more preferably 0.94 g/cm$^3$ or more, and preferably 0.97 g/cm$^3$ or less, more preferably 0.96 g/cm$^3$ or less.

A polyolefin foam layer may be composed of the polyolefin resin alone, or a mixture of the polyolefin resin and an elastomer. Examples of the elastomer include an ethylene-propylene-diene rubber (EPDM), an ethylene-propylene rubber (EPM), and a styrene rubber. Further, examples of the elastomer include a thermoplastic elastomer. Examples of the thermoplastic elastomer include an olefin thermoplastic elastomer and a styrene thermoplastic elastomer.

The content of the polyolefin resin in a polyolefin foam layer is preferably 50 mass % or more, more preferably 70 mass % or more, still more preferably 90 mass % or more, based on the total amount of the foam layer.

A polyurethane foam layer is formed of polyurethane resin and obtained by foaming an expandable resin composition containing a polyol compound and a polyisocyanate compound as described below.

The content of the polyurethane resin in a polyolefin foam layer is preferably 50 mass % or more, more preferably 70 mass % or more, still more preferably 90 mass % or more, based on the total amount of foam layer.

[Production of Foam Layer]

The foam layer in the present invention is formed by foaming an expandable resin composition. Examples of a foaming method include a method of foaming with a foaming agent such as a thermally decomposable foaming agent and water, and a method of foaming with an inert gas such as carbon dioxide and butane gas as described below.

(Production of Polyolefin Foam Layer)

The polyolefin foam layer is produced, for example, by foaming an expandable resin composition containing the polyolefin resin described above and a foaming agent. Examples of the foaming agent include a chemical foaming agent and a physical foaming agent.

<Foaming Agent>

As the chemical foaming agent, a thermally decomposable foaming agent is preferred. As the thermally decomposable foaming agent, an organic foaming agent and an inorganic foaming agent are usable. Examples of the organic foaming agent include an azo compound such as azodicarbonamide, a metal salt of azodicarboxylic acid (e.g., barium azodicarboxylate), and azobisisobutyronitrile, a nitroso compound such as N,N'-dinitrosopentamethylene tetramine, a hydrazine derivative such as hydrazodicarbonamide, 4,4'-oxobis(benzenesulfonylhydrazide), and toluenesulfonylhydrazide, and a semicarbazide compound such as toluenesulfonyl semicarbazide.

Examples of the inorganic foaming agent include ammonium carbonate, sodium carbonate, ammonium hydrogen carbonate, sodium hydrogen carbonate, ammonium nitrite, sodium borohydride, and anhydrous monosodium citrate.

Among these, from the viewpoints of obtaining fine cells, economy and safety, an azo compound is preferred and azodicarbonamide is more preferred.

One of the thermally decomposable foaming agents may be used alone, or two or more may be used in combination.

Examples of the physical foaming agent include an inert gas described below.

The content of the foaming agent in an expandable resin composition is preferably 1 to 30 parts by mass, more preferably 2 to 25 parts by mass, still more preferably 2 to 20 parts by mass, relative to 100 parts by mass of a polyolefin resin. With an amount of the foaming agent compounded of 1 part by mass or more, the foam layer is moderately foamed, so that a certain degree of flexibility can be imparted. With an amount of the foaming agent compounded of 30 parts by mass or less, the foam layer is prevented from being excessively foamed, so that excellent mechanical strength of the foam layer can be obtained.

<Nucleating Agent>

The expandable resin composition may contain a nucleating agent. As the nucleating agent, any that has an effect for enhancing the progress rate in a generation step of crystal nuclei. By addition of a nucleating agent to a polyolefin resin such as a polyethylene resin and a polypropylene resin, the size of crystals to be formed can be reduced, so that the transparency of the foam layer improves.

Examples of the nucleating agent having an effect for enhancing the progress rate in a generation step of crystal nuclei include a material having an effect for facilitating the orientation of molecular chains through an adsorption step of the molecular chains of a polymer.

More specifically, examples include a high melting point polymer, an organic carboxylic acid or a metal salt thereof, aliphatic alcohols, dibenzylidene sorbitol or a derivative thereof, a partial metal salt of rosin acid, an amide compound, an inorganic fine particle, an organic phosphoric acid compound or a metal salt thereof, imides, quinacridones, quinones, an aromatic sulfonate or a metal salt thereof, saccharides, and a mixture thereof. These may be used alone or in combination of two or more.

<Additive>

The expandable resin composition may contain a component such as a crosslinking aid, a decomposition temperature conditioner, and an antioxidant. The types and amounts of the crosslinking aid, the decomposition temperature conditioner, and the antioxidant are the same as described above.

In the expandable resin composition, an additive other than those described above that is usually used in a foam such as a heat stabilizer, a colorant, a fire retardant, an antistatic agent, and a filler may be compounded.

(Production Step of Polyolefin Foam Layer)

The production method of a polyolefin foam layer is not particularly limited, and the foam may be produced by heating an expandable sheet made of an expandable resin composition containing at least a polyolefin resin and a thermally decomposable foaming agent so as to foam the thermally decomposable foaming agent. More specifically, it is preferable that the production method contain the following steps (1) to (3):

Step (1): a step of forming an expandable sheet made of an expandable resin composition containing at least a polyolefin resin and a thermally decomposable foaming agent;

Step (2): a step of irradiating an ionizing radiation to the expandable sheet to cause crosslinking in the expandable sheet; and Step (3): a step of heating the cross-linked expandable sheet to foam the thermally decomposable foaming agent so that a foam layer is obtained.

In the step (1), the method for forming an expandable sheet is not particularly limited, and forming may be performed by, for example, supplying a polyolefin resin, a thermally decomposable foaming agent, and a nucleating agent and an additive that are compounded on an as needed basis to an extruder, melt-kneading the mixture, and extruding an expandable resin composition from the extruder into a sheet form. Alternatively, the foam layer may be formed by pressing an expandable resin composition.

The forming temperature of the expandable resin composition (i.e., temperature during extrusion or temperature during pressing) is preferably 50° C. or more and 250° C. or less, more preferably 80° C. or more and 180° C. or less.

In the step (2), as the method for cross-linking the expandable sheet, a method for irradiating an ionizing radiation such as an electron beam, an α ray, a β ray, and a γ ray to the expandable sheet may be used. The dose of the ionizing radiation may be controlled, such that the crosslinking degree of the resulting foam layer is in the desired range described above, being preferably 1 to 9 Mrad, more preferably 1.9 to 5 Mrad.

In the step (3), the heating temperature during foaming of the thermally decomposable foaming agent by heating the expandable sheet may be equal to or more than the foaming temperature of the thermally decomposable foaming agent, being preferably 200 to 300° C., more preferably 220 to 280° C.

In the present production method, the expandable sheet may be stretched in either one or both of MD and TD. Stretching of the expandable sheet may be performed after obtaining the foam layer by foaming the expandable sheet, or may be performed during foaming the expandable sheet. Incidentally, in the case where the foam layer is stretched after obtaining the foam layer by foaming the expandable sheet, the foam layer may be subsequently stretched while maintaining the melting state during foaming without cooling of the foam layer, or the foam layer may be cooled and then reheated into a molten or softened state so as to be stretched. The foam layer is easily thinned by stretching. During stretching, the foam layer may be heated to, for example, 100 to 280° C., preferably 150 to 260° C. In the present invention, by stretching, the cell size of the foam increases along either one or both of MD and TD, so that the light transparency tends to be enhanced.

In the steps (1) to (3), instead of exposure to ionizing radiation, crosslinking may be performed by a method including compounding an organic peroxide in the polyolefin resin composition in advance and heating the expandable sheet to decompose the organic peroxide.

The production method of a polyolefin foam layer is not limited to the method including the steps (1) to (3), and foaming may be performed by physical foaming.

In the case of physical foaming, it is preferable that a resin composition containing a polyolefin resin and a nucleating agent and an additive on an as needed basis be impregnated with a physical foaming agent. It is preferable that the impregnation of the physical foaming agent be performed after the resin composition is formed into a sheet. Alternatively, a resin composition formed into a sheet may be electron-irradiated and then impregnated with a physical foaming agent. The electron beam irradiation may be performed by the same manner as in the step (2).

As the physical foaming agent, use of a high-pressure inert gas is preferred. The inert gas is not particularly limited, so long as the gas is inert to the resin composition and the resin composition can be impregnated with the gas, and examples of the gas include carbon dioxide, butane gas, nitrogen gas and air. The gases may be mixed for use. Among these, from the viewpoint of increasing the expansion ratio of the foam layer, carbon dioxide and butane gas are preferred. It is preferable that the inert gas for impregnation be in a supercritical state or a subcritical state.

(Production of Polyurethane Foam Layer)

The polyurethane foam layer is obtained by foaming and curing an expandable resin composition containing a polyol compound, an isocyanate compound, and a foaming agent.

<Polyol Compound>

Examples of the polyol compound include a polylactone polyol, a polycarbonate polyol, an aromatic polyol, an alicyclic polyol, aliphatic polyol, a polyester polyol, and a polyether polyol. The polyol compound may be a polymer polyol. One of the polyol compounds may be used alone or two or more may be used in combination.

Examples of the polylactone polyol include polypropiolactone glycol, polycaprolactone glycol, and polyvalerolactone glycol.

Examples of the polycarbonate polyol include a dealcoholization reaction product between a hydroxyl group-containing compound and a carbonate compound. Examples of the hydroxyl group-containing compound include ethylene glycol, propylene glycol, butane diol, pentane diol, hexane diol, octane diol, and nonane diol. Examples of the carbonate compound include diethylene carbonate and dipropylene carbonate.

Examples of the aromatic polyol include bisphenol A, bisphenol F, phenol novolac, and cresol novolac.

Examples of the alicyclic polyol include cyclohexane diol, methylcyclohexane diol, isophorone diol, dicyclohexylmethane diol, and dimethyldicyclohexylmethane diol.

Examples of the aliphatic polyol include ethylene glycol, propylene glycol, butane diol, pentane diol and hexane diol.

Examples of the polyester polyol include a dehydration condensation product of a polybasic acid and a polyalcohol, a ring-opening polymer of lactone, and a condensate of a hydroxycarboxylic acid and a polyalcohol. Examples of the polybasic acid include adipic acid, azelaic acid, sebacic acid, terephthalic acid, isophthalic acid, and succinic acid. Examples of the polyalcohol include bisphenol A, ethylene glycol, propylene glycol, butane diol, diethylene glycol, hexane glycol, and neopentyl glycol. Examples of the lactone include δ-caprolactone and α-methyl-ε-caprolactone. Examples of the hydroxycarboxylic acid include castor oil, and a reaction product between castor oil and ethylene glycol.

Examples of the polyether polyol include a ring-opening polymer of an active hydrogen compound having two or more active hydrogen atoms and an alkylene oxide. Examples of the alkylene oxide include ethylene oxide, propylene oxide, and tetrahydrofuran. It is preferable that the molecular weight of the active hydrogen compound be low. Examples of the active hydrogen compound include a diol compound such as bisphenol A, ethylene glycol, propylene glycol, butylene glycol and 1,6-hexane diol, a triol compound such as glycerol and trimethylol propane, and an amine compound such as ethylene diamine and butylene diamine.

Examples of the polymer polyol include a graft polymer composed of an unsaturated organic compound graft-polymerized to a polyol compound, a polybutadiene polyol, a modified polyol of polyalcohol, and a hydrogenated product thereof.

In the graft polymer, examples of the polyol compound include an aromatic polyol, an alicyclic polyol, an aliphatic polyol, a polyester polyol, and a polyether polyol. Examples of the unsaturated organic compound include acrylonitrile, styrene, and methyl(meth)acrylate.

Examples of the modified polyol of polyalcohol include a modified reaction product of a polyalcohol and an alkylene oxide. Examples of the polyalcohol include a trihydric alcohol such as glycerol and trimethylol propane, tetrahydric to nonahydric alcohols such as pentaerythritol, sorbitol, mannitol, sorbitan, diglycerol, dipentaerythritol, saccharides, glucose, mannose, fructose, methyl glycoside and derivatives thereof, a phenol compound such as phenol, phloroglucin, cresol, pyrogallol, catechol, hydroquinone, bisphenol A, bisphenol F, bisphenol S, 1-hydroxynaphthalene, 1,3,6,8-tetrahydroxynaphthalene, anthrol, 1,4,5,8-tetrahydroxy anthracene, and 1-hydroxypyrene, a polyfunctional (e.g., number of functional groups: 2 or more and 100 or less) polyol such as polybutadiene polyol, castor oil polyol, a (co)polymer of hydroxyalkyl(meth)acrylate, and a polyvinyl alcohol, and a condensate of phenol and formaldehyde (novolac). Examples of the alkylene oxide include an alkylene oxide having 2 or more and 6 or less carbon atoms. Specific examples of the alkylene oxide include ethylene oxide, 1,2-propylene oxide, 1,3-propylene oxide, 1,2-butylene oxide, and 1,4-butylene oxide. From the viewpoint of improving properties and reactivity, the alkylene oxide is preferably 1,2-propylene oxide, ethylene oxide, or 1,2-butylene oxide, more preferably 1,2-propylene oxide or ethylene oxide. One of the alkylene oxides may be used alone, or two or more may be used in combination.

<Polyisocyanate Compound>

Examples of the polyisocyanate compound include an aromatic polyisocyanate, an alicyclic polyisocyanate, and an aliphatic polyisocyanate.

Examples of the aromatic polyisocyanate include phenylene diisocyanate, tolylene diisocyanate, xylylene diisocyanate, diphenylmethane diisocyanate, dimethyldiphenylmethane diisocyanate, triphenylmethane triisocyanate, naphthalene diisocyanate, and polymethylene polyphenyl polyisocyanate.

Examples of the alicyclic polyisocyanate include cyclohexylene diisocyanate, methylcyclohexylene diisocyanate, isophorone diisocyanate, dicyclohexylmethane diisocyanate, and dimethyldicyclohexylmethane diisocyanate.

Examples of the aliphatic polyisocyanate include methylene diisocyanate, ethylene diisocyanate, propylene diisocyanate, tetramethylene diisocyanate, and hexamethylene diisocyanate.

Relative to 100 parts by mass of the polyol compound, the content of the isocyanate compound is preferably 10 parts by mass or more, more preferably 15 parts by mass or more, and preferably 35 parts by mass or less, more preferably 30 parts by mass or less.

<Foaming Agent>

Examples of the foaming agent for use in production of a polyurethane foam layer include water and an organic halogen compound.

Examples of the organic halogen compound include an organic chlorine compound and an organic fluorine compound.

Examples of the organic chlorine compound include dichloroethane, propyl chloride, isopropyl chloride, butyl chloride, isobutyl chloride, pentyl chloride and isopentyl chloride.

Examples of the organic fluorine compound include difluoromethane (HFC32), 1,1,1,2,2-pentafluoroethane (HFC125), 1,1,1-trifluoroethane (HFC143a), 1,1,2,2-tetrafluoroethane (HFC134), 1,1,1,2-tetrafluoroethane (HFC134a), 1,1-difluoroethane (HFC152a), 1,1,1,2,3,3,3-heptafluoropropane (HFC227ea), 1,1,1,3,3-pentafluoropropane (HFC245fa), 1,1,1,3,3-pentafluorobutane (HFC365mfc), and 1,1,1,2,2,3,4,5,5,5-decafluoropentane (HFC4310mee).

The content of the foaming agent may be appropriately controlled corresponding to the type of the foaming agent. In the case of using water as the foaming agent, relative to 100 parts by mass of a polyol compound and a polyisocyanate compound in total, the content of the foaming agent may be preferably 1 to 10 parts by mass, more preferably 1 to 5 parts by mass. In the case of using an organic halogen compound as the foaming agent, relative to 100 parts by mass of a polyol compound and a polyisocyanate compound in total, the content of the foaming agent may be preferably 1 to 10 parts by mass, more preferably 1 to 5 parts by mass. In the case of using water and an organic halogen compound as the foaming agent, it is preferable that each of the amounts compounded be controlled in the range as described above.

<Catalyst>

The expandable resin composition may contain a catalyst. Examples of the catalyst include a urethanation catalyst and a trimerization catalyst. Examples of the urethanation catalyst include an amine catalyst. Examples of the trimerization catalyst include an aromatic compound, an alkali metal salt of carboxylic acid, a quaternary ammonium salt of carboxylic acid, and a quaternary ammonium salt/ethylene glycol mixture.

The content (total amount) of the catalyst is preferably 0.05 to 1 part by mass relative to 100 parts by mass of a polyol compound and a polyisocyanate compound in total.

The expandable resin composition for use in production of a polyurethane foam layer may further contain a decomposition temperature conditioner, an antioxidant, a heat stabilizer, a colorant, a fire retardant, an antistatic agent, and a filler, in addition to those described above.

The polyurethane foam layer may be obtained by foaming and curing the expandable resin composition described above. For example, the expandable resin composition injected in a mold may be heated to cause foaming and curing. After foaming and curing of the expandable resin composition, the resulting cured product may be sliced into a desired thickness to control the thickness of the foam layer.

(Printed Layer and Printed Film Layer)

The laminated body of the present invention may have at least either one of the printed layer and the printed film layer as described above. Thereby, the shape corresponding to a printed pattern is able to be detected from the skin layer side by the light. The printed layer may be formed, for example, by printing on one surface of the foam layer. The printed film layer is made by forming a printed layer on a base material film such as a polyolefin film and polyester film such as a PET film. As the method for forming the printed layer, a known method such as an ink jet method may be appropriately used. The thickness of the printed layer is preferably 1 to 25 μm, more preferably 2 to 10 μm. The thickness of the printed film layer is preferably 4 to 50 μm, more preferably 12 to 25 μm.

Even in the case where the laminated body has no printed layer and no printed film layer, character information is able to be visually recognized from the skin layer side by irradiating light from the foam layer side to display certain character information.

(Production of Laminated Body)

The laminated body of the present invention is able to be produced, for example, by laminating a foam layer and a skin layer, and a printed film layer disposed on an as needed basis. The specific layer structure is as described above. As the foam layer, one having a printed layer may be used. The lamination may be performed by thermal lamination or by bonding the layers to each other through an adhesive.

(Light Display Component)

The laminated body of the present invention is suitably used as a light display component. In other words, a light display component having the laminated body is a suitable application. Although the structure of the light display component is not particularly limited, a structure having a laminated body and an information display part is preferred. For example, a light display component with a skin layer, a foam layer, and an information display part laminated in this order may be produced. Examples of the information display part include a display and arrayed LEDs. The arrayed LEDs include a plurality of LEDs arranged in a specific shape to display specific information.

The light display component may have a sensor element, and, for example, the information display part may be a display having a sensor element such as a touch panel.

The display component is suitably used for use in vehicles such as automobiles. It is preferable that the display component be used as a component for displaying necessary information on temperature, time, vehicle speed, danger, safety, prior notice, etc., or as a design or illumination component.

EXAMPLES

The present invention is more specifically described with reference to Examples, though the present invention is not limited thereto.

[First Invention: Cross-Linked Polyolefin Resin Foam]
[Measurement Method]

The method for measuring each property in the present specification is as follows.

<Apparent Density>

The apparent density of a foam was measured in accordance with JIS K7222: 2005.

<Expansion Ratio>

The expansion ratio was calculated by dividing the density of an expandable sheet before foaming by the density (apparent density) of a foam after foaming.

<Crosslinking Degree (Gel Fraction)>

About 100 mg of a test piece was collected from a foam sheet, and the weight A (mg) of the test piece was precisely measured. Subsequently, the test piece was immersed in 30 cm$^3$ of xylene at 120° C. and left standing for 24 hours. Filtration was then performed with a 200-mesh wire mesh to collect an insoluble matter on the wire mesh. The insoluble matter was vacuum-dried and subjected to accurate measurement of the weight B (mg). From the measurement value, the crosslinking degree (mass %) was calculated based on the following equation.

Crosslinking degree (mass %)=($B/A$)×100

<Total Light Transmittance>

The total light transmittance of the foam with a thickness controlled as described in Table 1 was measured in accordance with ASTM D1003 with a haze meter.

<Evaluation on Visual Recognizability>

The evaluation of visual recognizability was performed as described below.

First, a polyvinyl chloride sheet containing an ABS resin (thickness: 0.6 mm) was prepared as skin material. On the surface of the polyvinyl chloride sheet, characters "abc" were described, such that each of the characters has a font size of 12.

Subsequently, a two-layered laminated body of a cross-linked polyolefin resin foam produced in Examples or Comparative Examples and the skin material was placed in a pressing mold (depth: 10 mm, mold: 8 mm, curvature radius of cavity: 5 mm) maintained at 160° C., and pressed at a pressure of 0.2 kg/cm$^2$ for 25 seconds, so that a molded product was obtained.

The molded product was lighted up with LED from the cross-linked polyolefin resin foam side toward the skin material side so as to determine whether the characters were visually recognized from 1 m away. In the case where the characters were visually recognized, evaluation was graded as "A", and in the case where the characters were not visually recognized, evaluation was graded as "B". The results are shown in Table 1.

<Raw Material Used>

The raw materials that were used in Examples or Comparative Examples are as described below.

[Polyolefin Resin]

PP: "NOBLEN AD571" manufactured by Sumitomo Chemical Co., Ltd. (density: 0.900 g/cm$^3$)

LLDPE: "NIPOLON-Z ZF231B" manufactured by Tosoh Corporation (density: 0.917 g/cm$^3$)

LDPE: "UBE Polyethylene F522N" manufactured by Ube Maruzen Polyethylene Co., Ltd. (density 0.922 g/cm$^3$)

EVA (1): "ULTRASEN 636" manufactured by Tosoh Corporation (density: 0.941 g/cm$^3$)

EVA (2): "ULTRASEN 710" manufactured by Tosoh Corporation (density: 0.949 g/cm$^3$)

[Elastomer]

HSBR: "DYNARON 1320P" manufactured by JSR Corporation

SEBC: "DYNARON 4600P" manufactured by JSR Corporation

Nucleating agent: saccharide-based "NAT-95" manufactured by Tokyo Printing Ink Mfg. Co., Ltd.

Foaming agent: "AC #R" (azodicarbonamide) manufactured by Eiwa Chemical Ind. Co., Ltd.

Crosslinking aid: "LIGHT ESTER 1.9-ND" (1,9-nonanediol dimethacrylate) manufactured by Kyoeisha Chemical Co., Ltd.

Antioxidant: "IRGANOX 1010" manufactured by BASF Japan.

Decomposition temperature conditioner (1): zinc oxide manufactured by Sakai Chemical Industry Co., Ltd.

Decomposition temperature conditioner (2): zinc stearate "SZ-2000" manufactured by Sakai Chemical Industry Co., Ltd.

Example 1

An expandable sheet having a thickness of 0.3 mm was obtained by melt-kneading 80 parts by mass of a polypropylene resin (PP), 19 parts by mass of polyethylene resin (LLDPE), 2 parts by mass of a nucleating agent, 8 parts by mass of a foaming agent, 3 parts by mass of a crosslinking aid and 0.8 parts by mass of an antioxidant, and then pressing the mixture. Both sides of the resulting expandable sheet were irradiated with 3 Mrad of electron beams at an acceleration voltage of 500 keV, so that the expandable sheet was cross-linked. Subsequently, the cross-linked expandable sheet was heated at 250° C. to cause foaming, so that a foam sheet having an apparent density of 0.09 g/cm$^3$ and a thickness of 1.0 mm was obtained.

The evaluation results of the resulting foam are shown in Table 1.

Examples 2 to 17, and Comparative Examples 1 to 6

The procedure was conducted in the same manner as in Example 1, except that the compounding of the polyolefin resin composition was changed as shown in Table 1, and the dose of electron beams was controlled, such that the crosslinking degree shown in Table 1 was obtained. The evaluation results of the resulting foam are shown in Table 1.

TABLE 1

| | | | Example | | | | | | | | | | | | | | | | | | Comparative Example | | | | | |
|---|---|---|---|---|---|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 | 1 | 2 | 3 | 4 | 5 | 6 |
| Composition (parts by mass) | Polyolefin resin | PP | 80 | 80 | 100 | 100 | 100 | 70 | 70 | 70 | 80 | 80 | 90 | 90 | 90 | 70 | 65 | | | 60 | 60 | 80 | 60 | 70 | 65 |
| | | LLDPE | 19 | 19 | | | | | | | | | | | | 20 | 15 | | | 40 | | 20 | 40 | 20 | 15 |
| | | LDPE | | | | | | | | | | | | | | | | 90 | | | 40 | | | | |
| | | EVA (1) | | | | | | 28 | 28 | | | | | | | | | | | | | | | | |
| | | EVA (2) | | | | | | | | 28 | | | | | | | | | 80 | | | | | | |
| | Elastomer | HSBR | | | | | | | | | 15 | 15 | 5 | 5 | 5 | 10 | 20 | 10 | 20 | | | | | 10 | 20 |
| | | SEBC | | | | | | | | | | | | | | | | | | | | | | | | |
| | Nucleating agent | | 2 | 2 | 2 | 2 | 2 | 2 | 2 | 2 | 5 | 5 | 5 | 5 | 5 | 8 | 8 | 8 | 8 | 2 | 2 | 8 | 8 | 8 | 8 |
| | Foaming agent | | 8 | 8 | 5 | 5 | 5 | 5 | 5 | 5 | 2 | 2 | 2 | 2 | 2 | 3 | 3 | 3 | 3 | 5 | 5 | 2 | 2 | 3 | 3 |
| | Crosslinking aid | | 3 | 3 | 5 | 5 | 5 | 2 | 2 | 2 | 3 | 3 | 4 | 4 | 4 | | | | | 2 | 2 | 2 | 2 | | |
| | Antioxidant | | 0.8 | 0.8 | 0.8 | 0.8 | 0.8 | 0.8 | 0.8 | 0.8 | 0.8 | 0.8 | 0.2 | 0.2 | 0.2 | 0.4 | 0.4 | 0.4 | 0.4 | 0.8 | 0.8 | 0.4 | 0.4 | 0.4 | 0.4 |
| | Decomposition temperature conditioner (1) | | | | | | | | | | | | | | | | | 0.5 | 0.5 | | | | | | |
| | Decomposition temperature conditioner (2) | | | | | | | | | | | | | | | | | | 0.5 | | | | | | |
| Property | Thickness of foam (mm) | | 1.0 | 0.5 | 0.5 | 1.0 | 0.3 | 1.0 | 0.5 | 0.3 | 0.5 | 0.3 | 1.0 | 0.5 | 0.3 | 1.9 | 1.4 | 1.0 | 1.0 | 1.0 | 0.5 | 2.1 | 1.5 | 2.8 | 2.6 |
| | Expansion ratio of foam (times) | | 10 | 8 | 5 | 5 | 3 | 5 | 4 | 4 | 2 | 2 | 2.5 | 2 | 2.5 | 15 | 12 | 8 | 8 | 5 | 4 | 20 | 15 | 14 | 12 |
| | Apparent density (g/cm³) | | 0.09 | 0.12 | 0.19 | 0.19 | 0.31 | 0.19 | 0.23 | 0.23 | 0.47 | 0.47 | 0.37 | 0.47 | 0.37 | 0.06 | 0.08 | 0.12 | 0.12 | 0.19 | 0.23 | 0.05 | 0.06 | 0.07 | 0.08 |
| | Degree of crosslinking (mass %) | | 40 | 40 | 42 | 42 | 42 | 39 | 39 | 39 | 40 | 40 | 45 | 45 | 45 | 38 | 38 | 30 | 30 | 35 | 35 | 40 | 40 | 38 | 38 |
| Evaluation | Total light transmittance of foam (%) | | 50 | 64 | 71 | 51 | 74 | 48 | 51 | 60 | 74 | 82 | 55 | 69 | 84 | 33 | 34 | 45 | 44 | 29 | 40 | 26 | 27 | 19 | 16 |
| | 25% Compressive strength (kPa) | | 126 | 132 | 186 | 183 | 192 | 126 | 73 | 69 | 148 | 139 | 196 | 187 | 171 | 86 | 97 | 58 | 62 | 48 | 49 | 86 | 81 | 120 | 126 |
| | Evaluation on visual recognizability from molding component | | A | A | A | A | A | A | A | A | A | A | A | A | A | A | A | A | A | B | B | B | B | B | B |

As shown in the results, it has been found that the polyolefin resin foam of the present invention has excellent light transparency at the thickness of 0.3 mm to 5.0 mm.

[Second Invention: Laminated Body]

The evaluation method is as follows.

<Asker C Hardness>

By using an Asker rubber hardness tester C-type (manufactured by Kobunshi Keiki Co., Ltd.), an indenter point of the hardness tester was brought into contact with the skin layer of a laminated body for the measurement. The measurement was performed at 25° C.

<Expansion Ratio>

The expansion ratio was calculated by determining the density (apparent density) of a foam layer and then calculating the reciprocal of the density. The apparent density was measured in accordance with JIS K7222: 2005.

<Gel Fraction (Crosslinking Degree)>

About 100 mg of a test piece was collected from a foam sheet, and the weight A (mg) of the test piece was precisely measured. Subsequently, the test piece was immersed in 30 cm³ of xylene at 120° C. and left standing for 24 hours.

Filtration was then performed with a 200-mesh wire mesh to collect an insoluble matter on the wire mesh. The insoluble matter was vacuum-dried and subjected to accurate measurement of the weight B (mg). From the measurement value, the crosslinking degree (mass %) was calculated based on the following equation.

Crosslinking degree (mass %)=($B/A$)×100

<Total Light Transmittance>

The total light transmittance was measured in accordance with ASTM D1003 with a haze meter.

<Evaluation on Translucency>

The inside was visually observed from the skin layer side to make evaluation based on the degree of visual recognition of a foam layer.

A: The foam layer is completely invisible.
B: A part of the foam layer is visible.
C: The whole of the foam layer is visible.

<Raw Material Used for Foam Layer>

The materials that were used in Examples or Comparative Examples are as described below.

[Polyolefin Resin]

Polypropylene resin (PP): "NOBLEN AD571" manufactured by Sumitomo Chemical Co., Ltd. (density: 0.900 g/cm³)

Polyethylene resin (LLDPE, linear low density polyethylene): "NIPOLON-Z ZF231B" manufactured by Tosoh Corporation (density: 0.917 g/cm³)

Polyethylene resin (LDPE (1), low density polyethylene): "UBE Polyethylene F522N" manufactured by Ube Maruzen Polyethylene Co., Ltd. (density 0.922 g/cm³)

Polyethylene resin (LDPE (2), low density polyethylene): sdabic "1905UO" (density 0.920 g/cm³)

EVA: "ULTRASEN 636" manufactured by Tosoh Corporation (density: 0.941 g/cm³)

[Polyurethane Resin]

Polyol compound (1): GP3000 manufactured by Sanyo Chemical Industries, Ltd.

Polyol compound (2): ethylene glycol

Polyisocyanate compound: Coronate T-80 manufactured by Nippon Polyurethane Industry Co., Ltd.

[Foaming Agent]

Azodicarbonamide (1): "AC #R" (azodicarbonamide) manufactured by Eiwa Chemical Ind. Co., Ltd.

Azodicarbonamide (2): "SO-L" (azodicarbonamide) manufactured by Otsuka Chemical Co., Ltd.

Water

Crosslinking aid: "LIGHT ESTER 1.9-ND" (1,9-nonanediol dimethacrylate) manufactured by Kyoeisha Chemical Co., Ltd.

Antioxidant: "IRGANOX 1010" manufactured by BASF Japan.

Decomposition temperature conditioner: "Zinc oxide type II" manufactured by Sakai Chemical Industry Co., Ltd.

Catalyst: "U-28" manufactured by Nitto Kasei Co., Ltd.

Foam stabilizer: "L-626" manufactured by Momentive

<Skin Layer>

The skin layer that used in Examples and Comparative Examples contains a pigment master batch (PEX 99901 manufactured by Tokyo Ink Mfg. Co., Ltd.) containing 40 wt % of a pigment (carbon black), and an olefin thermoplastic elastomer (TPO). The amount of the pigment master batch compounded and the content of the pigment were adjusted as shown in Table 2. The content of the pigment shown in Table 2 is a value based on the total amount of the skin layer.

Example 18

An expandable sheet was obtained by melt-kneading 85 parts by mass of a polypropylene resin (PP), 15 parts by mass of polyethylene resin (LLDPE), 6 parts by mass of a foaming agent, 3 parts by mass of a crosslinking aid and 0.5 parts by mass of an antioxidant, and then pressing the mixture. Both sides of the resulting expandable sheet were irradiated with 2 Mrad of electron beams at an acceleration voltage of 800 keV, so that the expandable sheet was cross-linked. Subsequently, the cross-linked expandable sheet was heated at 250° C. to cause foaming, so that a foam layer having an expansion ratio of 13 and a thickness of 0.6 mm was obtained.

The resulting foam layer and the skin layer were laminated with an adhesive sheet having a thickness of 0.03 mm ("3803H" manufactured by Sekisui Chemical Co., Ltd.) to obtain a laminated body.

The evaluation results of the resulting laminated body are shown in Table 2.

Examples 19 to 24, 28 and 29, and Comparative Examples 8 to 10

A laminated body was obtained in the same manner as in Example 18, except that the expandable resin composition and the type of the skin layer were changed as shown in Table 2, and the irradiation conditions of electron beams were appropriately changed, such that the crosslinking degree shown in Table 2 was obtained.

The resulting laminated body was subjected to each of the evaluations and the results are shown in Table 2.

Example 25

Into a single screw extruder, 100 parts by mass of a polyethylene resin (LDPE (2)) and 0.5 parts by mass of an antioxidant were fed and mixed with supercritical carbon dioxide injected thereto at 7 MPa. Extrusion molding was then performed to obtain a sheet-like foam, with temperature decreasing along with the travelling direction to the tip end of the single screw extruder, and with a temperature setting of 110° C. at the exit of the die.

Both sides of the resulting sheet-like foam were irradiated with 1.9 Mrad of electron beams at an acceleration voltage of 500 keV, so that a foam layer was obtained.

The resulting foam layer and the skin layer were laminated with an adhesive sheet having a thickness of 0.03 mm ("3803H" manufactured by Sekisui Chemical Co., Ltd.) to obtain a laminated body.

Comparative Examples 7 and 11

A laminated body was obtained in the same manner as in Example 25, except that the irradiation conditions of electron beams were appropriately changed and the type of the skin layer was changed as shown in Table 2, such that the crosslinking degree of the foam layer shown in Table 2 was obtained.

The resulting laminated body was subjected to each of the evaluations and the results are shown in Table 2.

Example 26

An expandable resin composition was prepared by mixing a polyol compound made of 100 parts by mass of a polyol compound (1) and 5 parts by mass of a polyol compound (2), 20 parts by mass of a polyisocyanate compound, 0.1 parts by mass of U-28 as catalyst, 2 parts by mass of L626 as foam stabilizer and 2 parts by mass of water as foaming agent. The expandable composition was injected into a mold (150 mm by 150 mm by 50 mm), and then heated in an oven at 80° C. for 60 minutes to cause foaming and curing, so that a cured product was obtained. The cured product was sliced to obtain a foam layer having a thickness of 3 mm.

The resulting foam layer and the skin layer were laminated with an adhesive sheet having a thickness of 0.03 mm ("3803H" manufactured by Sekisui Chemical Co., Ltd.) to obtain a laminated body.

The resulting laminated body was subjected to each of the evaluations and the results are shown in Table 2.

Example 27

A laminated body was obtained in the same manner as in Example 26, except that the expandable resin composition and the type of the skin layer were changed as shown in Table 2.

The resulting laminated body was subjected to each of the evaluations and the results are shown in Table 2.

TABLE 2

| | | | Example | | | | | | | | | |
|---|---|---|---|---|---|---|---|---|---|---|---|---|
| | | | 18 | 19 | 20 | 21 | 22 | 23 | 24 | 25 | 26 | |
| Expandable resin composition (part by mass) | Polyolefin resin | PP | 85 | 85 | 60 | 85 | | 80 | 80 | | | |
| | | LLDPE | 15 | 15 | 40 | 15 | | 20 | 20 | | | |
| | | LDPE(1) | | | | | | | | | | |
| | | LDPE(2) | | | | | | | | 100 | | |
| | | EVA | | | | | 100 | | | | | |
| | Polyurethane resin | Polyol compound (1) | | | | | | | | | 100 | |
| | | Polyol compound (2) | | | | | | | | | 5 | |
| | | Catalyst | | | | | | | | | 0.1 | |
| | | Polyisocyanate compound | | | | | | | | | 20 | |
| | Foaming agent | Azodicarbonamide (1) | 6 | 10 | 16 | 10 | 10 | 16 | 13 | | | |
| | | Azodicarbonamide (2) | | | | | | | | | | |
| | | Water | | | | | | | | | 2 | |
| | Crosslinking aid | | 3 | 3 | 3 | 63 | | 3 | 3 | | | |
| | Antioxidant | | 0.5 | 0.5 | 0.5 | 0.5 | 0.5 | 0.5 | 0.5 | 0.5 | | |
| | Decomposition temperature conditioner | | | | | | | | | | | |
| | Foam stabilizer | | | | | | | | | | 2 | |
| Laminated body | Skin layer | Thickness (mm) | 0.4 | 0.5 | 0.5 | 0.6 | 0.7 | 0.5 | 0.4 | 0.5 | 0.5 | |
| | | Total light transmittance (%) | 6 | 4 | 0.6 | 12 | 0.03 | 20 | 0.1 | 0.22 | 4 | |
| | | Amount of pigment master batch compounded (mass %) | 0.2 | 0.2 | 0.3 | 0.1 | 0.5 | 0.1 | 0.4 | 0.25 | 0.2 | |
| | | Content of pigment (mass %) | 0.08 | 0.08 | 0.12 | 0.04 | 0.2 | 0.04 | 0.16 | 0.1 | 0.08 | |
| | | Material | TPO | TPO | TPO | TPO | TPO | TPO | TPO | TPO | TPO | |
| | Foam layer | Thickness (mm) | 0.6 | 2 | 4 | 2 | 1.3 | 2 | 2 | 3.5 | 3 | |
| | | Total light transmittance (%) | 37 | 27 | 21 | 27 | 55 | 17 | 25 | 40 | 70 | |
| | | Expansion ratio (times) | 13 | 20 | 30 | 20 | 15 | 30 | 25 | 14 | 30 | |
| | | Crosslinking degree (mass %) | 30 | 33 | 23 | 29 | 40 | 35 | 25 | 12 | — | |
| | | Material | PP | PP | PP | PP | EVA | PP | PP | PE | PU | |
| | Evaluation | Asker C hardness of laminated body | 61 | 58 | 38 | 60 | 58 | 56 | 54 | 55 | 21 | |
| | | Total light transmittance of laminated body (%) | 1.6 | 1.24 | 0.36 | 2.55 | 0.18 | 2.33 | 0.02 | 0.02 | 1.42 | |
| | | Translucency | A | A | A | A | A | A | A | A | A | |

| | | | Example | | | Comparative Example | | | | |
|---|---|---|---|---|---|---|---|---|---|---|
| | | | 27 | 28 | 29 | 7 | 8 | 9 | 10 | 11 |
| Expandable resin composition (part by mass) | Polyolefin resin | PP | | 85 | 70 | | | | 70 | |
| | | LLDPE | | 15 | | | | 60 | | |
| | | LDPE(1) | | | 30 | | | 40 | 30 | |
| | | LDPE(2) | | | | 100 | | | | 100 |
| | | EVA | | | | | 100 | | | |
| | Polyurethane resin | Polyol compound (1) | 100 | | | | | | | |
| | | Polyol compound (2) | 5 | | | | | | | |
| | | Catalyst | 0.1 | | | | | | | |
| | | Polyisocyanate compound | 25 | | | | | | | |
| | Foaming agent | Azodicarbonamide (1) | | 10 | | | 10 | 15 | | |
| | | Azodicarbonamide (2) | | | 15 | | | | | 5 |
| | | Water | 2 | | | | | | | |

TABLE 2-continued

| | | | | | | | | | | | |
|---|---|---|---|---|---|---|---|---|---|---|---|
| | | Crosslinking aid | | 3 | | | | | | | |
| | | Antioxidant | | | 0.5 | 0.5 | 0.5 | 0.5 | 0.5 | 0.5 | 0.5 |
| | | Decomposition temperature conditioner | | | | 0.5 | | 0.5 | 0.5 | | |
| | | Foam stabilizer | 2 | | | | | | | | |
| Laminated body | Skin layer | Thickness (mm) | 0.2 | 0.5 | 0.4 | 1.1 | 0.6 | 0.4 | 0.4 | 0.3 | |
| | | Total light transmittance (%) | 4 | 31 | 6 | 0.2 | 0.01 | 6 | 6 | 0.07 | |
| | | Amount of pigment master batch compounded (mass %) | 0.1 | 0.05 | 0.2 | 0.5 | 0.2 | 0.2 | 0.2 | 0.5 | |
| | | Content of pigment (mass %) | 0.04 | 0.02 | 0.08 | 0.2 | 0.08 | 0.08 | 0.08 | 0.2 | |
| | | Material | PP | TPO | TPO | TPO | TPO | TPO | TPO | TPO | |
| | Foam layer | Thickness (mm) | 2 | 2 | 2 | 3.5 | 1.3 | 5 | 0.4 | 3.5 | |
| | | Total light transmittance (%) | 27 | 27 | 11 | 40 | 55 | 2 | 65 | 40 | |
| | | Expansion ratio (times) | 20 | 20 | 30 | 14 | 15 | 35 | 5 | 14 | |
| | | Crosslinking degree (mass %) | — | 29 | 35 | 30 | 40 | 32 | 45 | 12 | |
| | | Material | PU | PP | PE | PE | EVA | PE | PE | PE | |
| | Evaluation | Asker C hardness of laminated body | 68 | 59 | 45 | 71 | 59 | 38 | 83 | 48 | |
| | | Total light transmittance of laminated body (%) | 1.21 | 4.23 | 0.47 | 0.02 | 0.00 | 0.01 | 1.39 | 0.01 | |
| | | Translucency | A | B | A | A | A | A | A | A | |

It has been found that due to having an Asker C hardness equal to or less than a specified value, the laminated body of the present invention has a flexible tactile feel, high total light transmittance, and excellent transparency, allowing necessary information to be easily visually recognized from the skin layer side.

REFERENCE SIGNS LIST

10: LAMINATED BODY
11: SKIN LAYER
12: FOAM LAYER
13: LED
14: PRINTED LAYER

The invention claimed is:

1. A laminated body comprising a skin layer and a foam layer,
   wherein the skin layer has a thickness of 0.2 to 1.0 mm,
   wherein the skin layer has a total light transmittance of 0.02 to 30%,
   wherein the skin layer contains a pigment and the content of the pigment is 0.01 to 3 mass % based on the total amount of skin layer, and,
   wherein the laminated body has an Asker C hardness of 70 or less, and a total light transmittance of more than 0.01%.

2. The laminated body according to claim 1, wherein the foam layer has a thickness of 0.5 to 5 mm.

3. The laminated body according to claim 1, wherein the foam layer has a total light transmittance of 10% or more.

4. The laminated body according to claim 1, wherein the foam layer has an expansion ratio of 7 to 40.

5. The laminated body according to claim 1, wherein the foam layer is a polyolefin foam layer or a polyurethane foam layer.

6. The laminated body according to claim 1, wherein the laminated body further comprises at least one of a printed layer and a printed film layer.

7. The laminated body according to claim 6, wherein the printed layer is formed by printing a surface of at least either one of the foam layer and the skin layer.

8. A light display component comprising the laminated body according to claim 1.

9. The light display component according to claim 8, further comprising a sensor element.

10. The light display component according to claim 8, further comprising a display having a sensor element.

11. The laminated body according to claim 1, wherein the foam layer is formed by foaming an expandable resin composition containing a polyolefin resin and a nucleating agent.

12. The laminated body according to claim 1, wherein the foam layer includes zinc oxide or zinc stearate as a decomposition temperature conditioner.

* * * * *